United States Patent
Jarvis et al.

(10) Patent No.: US 12,492,074 B2
(45) Date of Patent: *Dec. 9, 2025

(54) HYBRID MODULAR STORAGE FETCHING SYSTEM

(71) Applicant: Staples, Inc., Framingham, MA (US)

(72) Inventors: Daniel Jarvis, Orlando, FL (US); Paolo Gerli Amador, Framingham, MA (US); Michael Bhaskaran, Seattle, WA (US); Amit Kalra, Acton, MA (US); Rodney Gallaway, Little Rock, AR (US); Vikranth Gopalakrishnan, Hoboken, NJ (US)

(73) Assignee: Staples, Inc., Framingham, MA (US)

( * ) Notice: Subject to any disclaimer, the term of this patent is extended or adjusted under 35 U.S.C. 154(b) by 189 days.

This patent is subject to a terminal disclaimer.

(21) Appl. No.: 18/349,872

(22) Filed: Jul. 10, 2023

(65) Prior Publication Data

US 2024/0043213 A1 Feb. 8, 2024

Related U.S. Application Data

(63) Continuation of application No. 16/809,361, filed on Mar. 4, 2020, now Pat. No. 11,697,554, which is a
(Continued)

(51) Int. Cl.
*B65G 1/137* (2006.01)
*G01C 21/20* (2006.01)
(Continued)

(52) U.S. Cl.
CPC .......... *B65G 1/1373* (2013.01); *B65G 1/137* (2013.01); *G01C 21/206* (2013.01);
(Continued)

(58) Field of Classification Search
None
See application file for complete search history.

(56) References Cited

U.S. PATENT DOCUMENTS

| 3,450,276 A | 6/1969 | Ferrari |
| 3,474,877 A | 10/1969 | Wesener |

(Continued)

FOREIGN PATENT DOCUMENTS

| CA | 1196712 A | 11/1985 |
| CA | 1210367 A | 8/1986 |

(Continued)

OTHER PUBLICATIONS

US 7,460,017 B2, 12/2008, Roeder et al. (withdrawn)
(Continued)

*Primary Examiner* — Abdhesh K Jha
(74) *Attorney, Agent, or Firm* — VLP Law Group, LLP; Michel Bohn

(57) ABSTRACT

A hybrid modular storage fetching system with a robot execution system (REX) is described. In an example implementation, a REX may induct, into the hybrid modular storage fetching system, an order identifying items to be fulfilled by automated guided vehicles (AGVs) at an order fulfillment facility. The REX may generate at task list including tasks for a first and second AGV, instruct the first AGV to retrieve a first item in the order from a first storage area based on the task list and deliver the first item to a pick-cell station. The REX may also instruct the second AGV to retrieve a second item of the order from a second storage area and deliver the second item to the pick-cell station. The REX may communicate with other components of the hybrid modular storage fetching system to coordinate the paths of the AGVs to fulfill the order.

20 Claims, 15 Drawing Sheets

Related U.S. Application Data continuation of application No. 15/863,050, filed on Jan. 5, 2018, now Pat. No. 10,589,931, which is a continuation-in-part of application No. 15/721,472, filed on Sep. 29, 2017, now Pat. No. 10,803,420.

(60) Provisional application No. 62/442,891, filed on Jan. 5, 2017, provisional application No. 62/403,001, filed on Sep. 30, 2016.

(51) Int. Cl.
 *G05D 1/00* (2024.01)
 *G06Q 10/087* (2023.01)
(52) U.S. Cl.
 CPC ......... *G05D 1/0088* (2013.01); *G05D 1/0225* (2013.01); *G05D 1/0285* (2013.01); *G05D 1/0297* (2013.01); *G06Q 10/087* (2013.01); *B65G 1/1378* (2013.01); *G05D 1/0274* (2013.01)

(56) References Cited

U.S. PATENT DOCUMENTS

| | | | |
|---|---|---|---|
| 3,563,327 A | 2/1971 | Mier |
| 3,628,624 A | 12/1971 | Wesener |
| 3,970,840 A | 7/1976 | De Bruine |
| 4,010,409 A | 3/1977 | Waites |
| 4,077,535 A | 3/1978 | Oriol |
| 4,215,759 A | 8/1980 | Diaz |
| 4,258,813 A | 3/1981 | Rubel |
| 4,278,142 A | 7/1981 | Kono |
| 4,465,155 A | 8/1984 | Collins |
| 4,496,274 A | 1/1985 | Pipes |
| 4,524,314 A | 6/1985 | Walker |
| 4,530,056 A | 7/1985 | Mackinnon et al. |
| 4,556,940 A | 12/1985 | Katoo et al. |
| 4,562,635 A | 1/1986 | Carter |
| 4,566,032 A | 1/1986 | Hirooka et al. |
| 4,593,238 A | 6/1986 | Yamamoto |
| 4,593,239 A | 6/1986 | Yamamoto |
| 4,652,803 A | 3/1987 | Kamejima et al. |
| 4,653,002 A | 3/1987 | Barry |
| 4,657,463 A | 4/1987 | Pipes |
| 4,678,390 A | 7/1987 | Bonneton et al. |
| 4,700,302 A | 10/1987 | Arakawa et al. |
| 4,711,316 A | 12/1987 | Katou et al. |
| 4,714,399 A | 12/1987 | Olson |
| 4,716,530 A | 12/1987 | Ogawa et al. |
| 4,727,492 A | 2/1988 | Reeve et al. |
| 4,742,283 A | 5/1988 | Bolger et al. |
| 4,751,983 A | 6/1988 | Leskovec et al. |
| 4,764,078 A | 8/1988 | Neri |
| 4,772,832 A | 9/1988 | Okazaki et al. |
| 4,773,018 A | 9/1988 | Mats |
| 4,777,601 A | 10/1988 | Boegli |
| 4,780,817 A | 10/1988 | Lofgren |
| 4,790,402 A | 12/1988 | Field et al. |
| 4,802,096 A | 1/1989 | Hainsworth et al. |
| 4,811,227 A | 3/1989 | Sigvard |
| 4,811,229 A | 3/1989 | Wilson |
| 4,817,000 A | 3/1989 | Eberhardt |
| 4,846,297 A | 7/1989 | Field et al. |
| 4,847,769 A | 7/1989 | Reeve |
| 4,847,773 A | 7/1989 | Van et al. |
| 4,847,774 A | 7/1989 | Tomikawa et al. |
| 4,852,677 A | 8/1989 | Okazaki |
| 4,857,912 A | 8/1989 | Everett et al. |
| 4,858,132 A | 8/1989 | Holmquist |
| 4,862,047 A | 8/1989 | Suzuki et al. |
| 4,863,335 A | 9/1989 | Herigstad et al. |
| 4,875,172 A | 10/1989 | Kanayama |
| 4,890,233 A | 12/1989 | Ando et al. |
| 4,918,607 A | 4/1990 | Wible |
| 4,924,153 A | 5/1990 | Toru et al. |
| 4,926,544 A | 5/1990 | Koyanagi et al. |
| 4,935,871 A | 6/1990 | Grohsmeyer |
| 4,939,650 A | 7/1990 | Nishikawa |
| 4,939,651 A | 7/1990 | Onishi |
| 4,942,531 A | 7/1990 | Hainsworth et al. |
| 4,947,324 A | 8/1990 | Kamimura et al. |
| 4,950,118 A | 8/1990 | Mueller et al. |
| 4,954,962 A | 9/1990 | Evans et al. |
| 4,982,329 A | 1/1991 | Tabata et al. |
| 4,990,841 A | 2/1991 | Elder |
| 4,993,507 A | 2/1991 | Ohkura |
| 4,994,970 A | 2/1991 | Noji et al. |
| 4,996,468 A | 2/1991 | Field et al. |
| 5,000,279 A | 3/1991 | Kondo et al. |
| 5,002,145 A | 3/1991 | Wakaumi et al. |
| 5,005,128 A | 4/1991 | Robins et al. |
| 5,006,988 A | 4/1991 | Borenstein et al. |
| 5,020,620 A | 6/1991 | Field |
| 5,023,790 A | 6/1991 | Luke, Jr. |
| 5,040,116 A | 8/1991 | Evans et al. |
| 5,052,882 A | 10/1991 | Blau et al. |
| 5,053,969 A | 10/1991 | Booth |
| 5,073,749 A | 12/1991 | Kanayama |
| 5,109,940 A | 5/1992 | Yardley |
| 5,111,401 A | 5/1992 | Everett et al. |
| 5,125,783 A | 6/1992 | Kawasoe et al. |
| 5,134,353 A | 7/1992 | Kita et al. |
| 5,138,560 A | 8/1992 | Lanfer et al. |
| 5,154,249 A | 10/1992 | Yardley |
| 5,164,648 A | 11/1992 | Kita et al. |
| 5,170,351 A | 12/1992 | Nemoto et al. |
| 5,170,352 A | 12/1992 | Mctamaney et al. |
| 5,179,329 A | 1/1993 | Nishikawa et al. |
| 5,187,664 A | 2/1993 | Yardley et al. |
| 5,191,528 A | 3/1993 | Yardley et al. |
| 5,192,903 A | 3/1993 | Kita et al. |
| 5,199,524 A | 4/1993 | Ivancic |
| 5,202,832 A | 4/1993 | Lisy |
| 5,211,523 A | 5/1993 | Andrada et al. |
| 5,216,605 A | 6/1993 | Yardley et al. |
| 5,239,249 A | 8/1993 | Ono |
| 5,249,157 A | 9/1993 | Taylor |
| 5,281,901 A | 1/1994 | Yardley et al. |
| 5,305,217 A | 4/1994 | Nakamura et al. |
| 5,341,130 A | 8/1994 | Yardley et al. |
| 5,387,853 A | 2/1995 | Ono |
| 5,488,277 A | 1/1996 | Nishikawa et al. |
| 5,505,473 A | 4/1996 | Radcliffe |
| 5,510,984 A | 4/1996 | Markin et al. |
| 5,525,884 A | 6/1996 | Sugiura et al. |
| 5,545,960 A | 8/1996 | Ishikawa |
| 5,548,512 A | 8/1996 | Quraishi |
| 5,564,890 A | 10/1996 | Knudsen, Jr. |
| 5,568,030 A | 10/1996 | Nishikawa et al. |
| 5,650,703 A | 7/1997 | Yardley et al. |
| 5,669,748 A | 9/1997 | Knudsen, Jr. |
| 5,875,408 A | 2/1999 | Bendett et al. |
| 5,877,962 A | 3/1999 | Radcliffe |
| 5,911,767 A | 6/1999 | Garibotto et al. |
| 5,923,270 A | 7/1999 | Sampo et al. |
| 5,961,559 A | 10/1999 | Shimbara et al. |
| 6,049,745 A | 4/2000 | Douglas et al. |
| 6,058,339 A | 5/2000 | Takiguchi et al. |
| 6,092,010 A | 7/2000 | Alofs et al. |
| 6,246,930 B1 | 6/2001 | Hori |
| 6,256,560 B1 | 7/2001 | Kim et al. |
| 6,345,217 B1 | 2/2002 | Zeitler et al. |
| 6,370,452 B1 | 4/2002 | Pfister |
| 6,377,888 B1 | 4/2002 | Olch |
| 6,459,966 B2 | 10/2002 | Nakano et al. |
| 6,477,463 B2 | 11/2002 | Hamilton |
| 6,481,521 B2 | 11/2002 | Sugiyama et al. |
| 6,493,614 B1 | 12/2002 | Jung |
| 6,602,037 B2 | 8/2003 | Winkler |
| 6,615,108 B1 | 9/2003 | Peless et al. |
| 6,629,028 B2 | 9/2003 | Paromtchik et al. |
| 6,654,647 B1 | 11/2003 | Kal |
| 6,694,216 B1 | 2/2004 | Fujiki et al. |
| 6,721,638 B2 | 4/2004 | Zeitler |

(56) References Cited

U.S. PATENT DOCUMENTS

| | | |
|---|---|---|
| 6,748,292 B2 | 6/2004 | Mountz |
| 6,772,062 B2 | 8/2004 | Lasky et al. |
| 6,882,910 B2 | 4/2005 | Jeong |
| 6,885,912 B2 | 4/2005 | Peless et al. |
| 6,895,301 B2 | 5/2005 | Mountz |
| 6,904,343 B2 | 6/2005 | Kang |
| 6,950,722 B2 | 9/2005 | Mountz |
| 6,971,464 B2 | 12/2005 | Marino et al. |
| 7,050,891 B2 | 5/2006 | Chen |
| 7,110,855 B2 | 9/2006 | Leishman |
| 7,155,309 B2 | 12/2006 | Peless et al. |
| 7,305,287 B2 | 12/2007 | Park |
| 7,333,631 B2 | 2/2008 | Roh et al. |
| 7,349,759 B2 | 3/2008 | Peless et al. |
| 7,402,018 B2 | 7/2008 | Mountz et al. |
| 7,403,120 B2 | 7/2008 | Duron et al. |
| 7,437,226 B2 | 10/2008 | Roh et al. |
| 7,460,016 B2 | 12/2008 | Sorenson et al. |
| 7,500,448 B1 | 3/2009 | Melhorn |
| 7,505,849 B2 | 3/2009 | Saarikivi |
| 7,548,166 B2 | 6/2009 | Roeder et al. |
| 7,557,714 B2 | 7/2009 | Roeder et al. |
| 7,599,777 B2 | 10/2009 | Passeri et al. |
| 7,609,175 B2 | 10/2009 | Porte et al. |
| 7,613,617 B2 | 11/2009 | Williams et al. |
| 7,616,127 B2 | 11/2009 | Sorenson et al. |
| 7,634,332 B2 | 12/2009 | Williams et al. |
| 7,639,142 B2 | 12/2009 | Roeder et al. |
| 7,648,329 B2 | 1/2010 | Chilson et al. |
| 7,656,296 B2 | 2/2010 | Runyon et al. |
| 7,681,796 B2 | 3/2010 | Cato et al. |
| 7,689,001 B2 | 3/2010 | Kim et al. |
| 7,693,757 B2 | 4/2010 | Zimmerman |
| 7,765,027 B2 | 7/2010 | Hong et al. |
| 7,826,919 B2 | 11/2010 | D'Andrea et al. |
| 7,835,821 B2 | 11/2010 | Roh et al. |
| 7,840,328 B2 | 11/2010 | Baginski et al. |
| 7,845,560 B2 | 12/2010 | Emanuel et al. |
| 7,850,413 B2 | 12/2010 | Fontana |
| 7,871,234 B2 | 1/2011 | Yuyama et al. |
| 7,873,469 B2 | 1/2011 | D'Andrea et al. |
| 7,890,228 B2 | 2/2011 | Redmann et al. |
| 7,894,932 B2 | 2/2011 | Mountz et al. |
| 7,894,933 B2 | 2/2011 | Mountz et al. |
| 7,894,939 B2 | 2/2011 | Zini et al. |
| 7,894,951 B2 | 2/2011 | Norris et al. |
| 7,912,574 B2 | 3/2011 | Wurman et al. |
| 7,912,633 B1 | 3/2011 | Dietsch et al. |
| 7,920,962 B2 | 4/2011 | D'Andrea et al. |
| 7,925,514 B2 | 4/2011 | Williams et al. |
| 7,953,551 B2 | 5/2011 | Park et al. |
| 7,980,808 B2 | 7/2011 | Chilson et al. |
| 7,991,521 B2 | 8/2011 | Stewart |
| 7,996,109 B2 | 8/2011 | Zini et al. |
| 8,010,230 B2 | 8/2011 | Zini et al. |
| 8,020,657 B2 | 9/2011 | Allard et al. |
| 8,031,086 B2 | 10/2011 | Thacher et al. |
| 8,068,978 B2 | 11/2011 | D'Andrea et al. |
| 8,072,309 B2 | 12/2011 | Kraimer et al. |
| 8,075,243 B2 | 12/2011 | Chilson et al. |
| 8,146,702 B2 | 4/2012 | Schendel et al. |
| 8,160,728 B2 | 4/2012 | Curtis |
| 8,170,711 B2 | 5/2012 | D'Andrea et al. |
| 8,192,137 B2 | 6/2012 | Ross et al. |
| 8,193,903 B2 | 6/2012 | Kraimer et al. |
| 8,196,835 B2 | 6/2012 | Emanuel et al. |
| 8,200,423 B2 | 6/2012 | Dietsch et al. |
| 8,204,624 B2 | 6/2012 | Zini et al. |
| 8,210,791 B2 | 7/2012 | Chilson et al. |
| 8,220,710 B2 | 7/2012 | Hoffman et al. |
| 8,229,619 B2 | 7/2012 | Roh et al. |
| 8,239,291 B2 | 8/2012 | Hoffman et al. |
| 8,265,873 B2 | 9/2012 | D'Andrea et al. |
| 8,269,643 B2 | 9/2012 | Chou |
| 8,271,132 B2 | 9/2012 | Nielsen et al. |
| 8,280,546 B2 | 10/2012 | D'Andrea et al. |
| 8,280,547 B2 | 10/2012 | D'Andrea et al. |
| 8,311,902 B2 | 11/2012 | Mountz et al. |
| 8,369,981 B2 | 2/2013 | Dunsker et al. |
| 8,381,982 B2 | 2/2013 | Kunzig et al. |
| 8,406,949 B2 | 3/2013 | Kondo |
| 8,412,400 B2 | 4/2013 | D'Andrea et al. |
| 8,417,444 B2 | 4/2013 | Smid et al. |
| 8,418,919 B1 | 4/2013 | Beyda |
| 8,425,173 B2 | 4/2013 | Lert et al. |
| 8,433,442 B2 | 4/2013 | Friedman et al. |
| 8,433,469 B2 | 4/2013 | Harvey et al. |
| 8,444,369 B2 | 5/2013 | Watt et al. |
| 8,452,464 B2 | 5/2013 | Castaneda et al. |
| 8,457,978 B2 | 6/2013 | Williams et al. |
| 8,473,140 B2 | 6/2013 | Norris et al. |
| 8,483,869 B2 | 7/2013 | Wurman et al. |
| 8,498,734 B2 | 7/2013 | Dunsker et al. |
| 8,515,612 B2 | 8/2013 | Tanaka et al. |
| 8,538,692 B2 | 9/2013 | Wurman et al. |
| 8,571,781 B2 | 10/2013 | Bernstein et al. |
| 8,577,551 B2 | 11/2013 | Siefring et al. |
| 8,587,455 B2 | 11/2013 | Porte et al. |
| 8,594,834 B1 | 11/2013 | Clark et al. |
| 8,594,835 B2 | 11/2013 | Lert et al. |
| 8,606,392 B2 | 12/2013 | Wurman et al. |
| 8,626,332 B2 | 1/2014 | Dunsker et al. |
| 8,626,335 B2 | 1/2014 | Wurman et al. |
| 8,639,382 B1 | 1/2014 | Clark et al. |
| 8,649,899 B2 | 2/2014 | Wurman et al. |
| 8,653,945 B2 | 2/2014 | Baek et al. |
| 8,670,892 B2 | 3/2014 | Yang |
| 8,676,426 B1 | 3/2014 | Murphy |
| 8,700,502 B2 | 4/2014 | Mountz et al. |
| 8,718,814 B1 | 5/2014 | Clark et al. |
| 8,718,815 B2 | 5/2014 | Shimamura |
| 8,725,286 B2 | 5/2014 | D'Andrea et al. |
| 8,725,317 B2 | 5/2014 | Elston et al. |
| 8,725,362 B2 | 5/2014 | Elston et al. |
| 8,725,363 B2 | 5/2014 | Elston et al. |
| 8,731,777 B2 | 5/2014 | Castaneda et al. |
| 8,740,538 B2 | 6/2014 | Lert et al. |
| 8,751,063 B2 | 6/2014 | Bernstein et al. |
| 8,751,147 B2 | 6/2014 | Colwell |
| 8,755,936 B2 | 6/2014 | Friedman et al. |
| 8,760,276 B2 | 6/2014 | Yamazato |
| 8,761,989 B1 | 6/2014 | Murphy |
| 8,788,121 B2 | 7/2014 | Klinger |
| 8,798,784 B1 | 8/2014 | Clark et al. |
| 8,798,786 B2 | 8/2014 | Wurman et al. |
| 8,798,840 B2 | 8/2014 | Fong et al. |
| 8,805,573 B2 | 8/2014 | Brunner et al. |
| 8,805,574 B2 | 8/2014 | Stevens et al. |
| 8,825,257 B2 | 9/2014 | Ozaki et al. |
| 8,825,367 B2 | 9/2014 | Nagasawa |
| 8,831,984 B2 | 9/2014 | Hoffman et al. |
| 8,862,397 B2 | 10/2014 | Tsujimoto et al. |
| 8,874,300 B2 | 10/2014 | Allard et al. |
| 8,874,360 B2 | 10/2014 | Klinger et al. |
| 8,880,416 B2 | 11/2014 | Williams et al. |
| 8,886,385 B2 | 11/2014 | Takahashi et al. |
| 8,892,240 B1 | 11/2014 | Vliet et al. |
| 8,892,241 B2 | 11/2014 | Weiss |
| 8,909,368 B2 | 12/2014 | D'Andrea et al. |
| 8,930,133 B2 | 1/2015 | Wurman et al. |
| 8,948,956 B2 | 2/2015 | Takahashi et al. |
| 8,954,188 B2 | 2/2015 | Sullivan et al. |
| 8,965,561 B2 | 2/2015 | Jacobus et al. |
| 8,965,562 B1 | 2/2015 | Wurman et al. |
| 8,965,578 B2 | 2/2015 | Versteeg et al. |
| 8,970,363 B2 | 3/2015 | Kraimer et al. |
| 8,972,045 B1 | 3/2015 | Mountz et al. |
| 8,983,647 B1 | 3/2015 | Dwarakanath et al. |
| 8,988,285 B2 | 3/2015 | Smid et al. |
| 8,989,918 B2 | 3/2015 | Sturm |
| 9,002,506 B1 | 4/2015 | Agarwal et al. |
| 9,002,581 B2 | 4/2015 | Castaneda et al. |
| 9,008,827 B1 | 4/2015 | Dwarakanath et al. |
| 9,008,828 B2 | 4/2015 | Worsley |

(56) References Cited

U.S. PATENT DOCUMENTS

| | | |
|---|---|---|
| 9,008,829 B2 | 4/2015 | Worsley |
| 9,008,830 B2 | 4/2015 | Worsley |
| 9,009,072 B2 | 4/2015 | Mountz et al. |
| 9,014,902 B1 | 4/2015 | Murphy |
| 9,020,679 B2 | 4/2015 | Zini et al. |
| 9,026,301 B2 | 5/2015 | Zini et al. |
| 9,043,016 B2 | 5/2015 | Filippov et al. |
| 9,046,893 B2 | 6/2015 | Douglas et al. |
| 9,051,120 B2 | 6/2015 | Lert et al. |
| 9,052,714 B2 | 6/2015 | Creasey et al. |
| 9,056,719 B2 | 6/2015 | Tanahashi |
| 9,067,317 B1 | 6/2015 | Wurman et al. |
| 9,073,736 B1 | 7/2015 | Hussain et al. |
| 9,082,293 B2 | 7/2015 | Wellman et al. |
| 9,087,314 B2 | 7/2015 | Hoffman et al. |
| 9,090,214 B2 | 7/2015 | Bernstein et al. |
| 9,090,400 B2 | 7/2015 | Wurman et al. |
| 9,096,375 B2 | 8/2015 | Lert et al. |
| 9,098,080 B2 | 8/2015 | Norris et al. |
| 9,110,464 B2 | 8/2015 | Holland et al. |
| 9,111,251 B1 | 8/2015 | Brazeau |
| 9,114,838 B2 | 8/2015 | Bernstein et al. |
| 9,120,621 B1 | 9/2015 | Curlander et al. |
| 9,120,622 B1 | 9/2015 | Elazary et al. |
| 9,122,276 B2 | 9/2015 | Kraimer et al. |
| 9,129,250 B1 | 9/2015 | Sestini et al. |
| 9,134,734 B2 | 9/2015 | Lipkowski et al. |
| 9,146,559 B2 | 9/2015 | Kuss et al. |
| 9,147,173 B2 | 9/2015 | Jones et al. |
| 9,150,263 B2 | 10/2015 | Bernstein et al. |
| 9,152,149 B1 | 10/2015 | Palamarchuk et al. |
| 9,185,998 B1 | 11/2015 | Dwarakanath et al. |
| 9,188,982 B2 | 11/2015 | Thomson |
| 9,193,404 B2 | 11/2015 | Bernstein et al. |
| 9,202,382 B2 | 12/2015 | Klinger et al. |
| 9,206,023 B2 | 12/2015 | Wong et al. |
| 9,207,673 B2 | 12/2015 | Pulskamp et al. |
| 9,207,676 B2 | 12/2015 | Wu et al. |
| 9,211,920 B1 | 12/2015 | Bernstein et al. |
| 9,213,934 B1 | 12/2015 | Versteeg et al. |
| 9,216,745 B2 | 12/2015 | Beardsley et al. |
| 9,218,003 B2 | 12/2015 | Fong et al. |
| 9,218,316 B2 | 12/2015 | Bernstein et al. |
| 9,242,799 B1 | 1/2016 | O'Brien et al. |
| 9,244,463 B2 | 1/2016 | Pfaff et al. |
| 9,248,973 B1 | 2/2016 | Brazeau |
| 9,260,244 B1 | 2/2016 | Cohn |
| 9,266,236 B2 | 2/2016 | Clark et al. |
| 9,268,334 B1 | 2/2016 | Vavrick |
| 9,274,526 B2 | 3/2016 | Murai et al. |
| 9,280,153 B1 | 3/2016 | Palamarchuk et al. |
| 9,280,157 B2 | 3/2016 | Wurman et al. |
| 9,286,590 B2 | 3/2016 | Segawa et al. |
| 9,290,220 B2 | 3/2016 | Bernstein et al. |
| 9,304,001 B2 | 4/2016 | Park et al. |
| 9,310,802 B1 | 4/2016 | Elkins et al. |
| 9,317,034 B2 | 4/2016 | Hoffman et al. |
| 9,329,078 B1 | 5/2016 | Mundhenke et al. |
| 9,329,599 B1 | 5/2016 | Sun et al. |
| 9,330,373 B2 | 5/2016 | Mountz et al. |
| 9,341,720 B2 | 5/2016 | Garin et al. |
| 9,342,811 B2 | 5/2016 | Mountz et al. |
| 9,346,619 B1 | 5/2016 | O'Brien et al. |
| 9,346,620 B2 | 5/2016 | Brunner et al. |
| 9,352,745 B1 | 5/2016 | Theobald |
| 9,355,065 B2 | 5/2016 | Donahue |
| 9,365,348 B1 | 6/2016 | Agarwal et al. |
| 9,367,827 B1 | 6/2016 | Lively et al. |
| 9,367,831 B1 | 6/2016 | Besehanic |
| 9,371,184 B1 | 6/2016 | Dingle et al. |
| 9,378,482 B1 | 6/2016 | Pikler et al. |
| 9,389,609 B1 | 7/2016 | Mountz et al. |
| 9,389,612 B2 | 7/2016 | Bernstein et al. |
| 9,389,614 B2 | 7/2016 | Shani |
| 9,394,016 B2 | 7/2016 | Bernstein et al. |
| 9,395,725 B2 | 7/2016 | Bernstein et al. |
| 9,404,756 B2 | 8/2016 | Fong et al. |
| 9,405,016 B2 | 8/2016 | Yim |
| 9,427,874 B1 | 8/2016 | Rublee |
| 9,429,940 B2 | 8/2016 | Bernstein et al. |
| 9,429,944 B2 | 8/2016 | Filippov et al. |
| 9,436,184 B2 | 9/2016 | D'Andrea et al. |
| 9,440,790 B2 | 9/2016 | Mountz et al. |
| 9,448,560 B2 | 9/2016 | D'Andrea et al. |
| 9,451,020 B2 | 9/2016 | Liu et al. |
| 9,452,883 B1 | 9/2016 | Wurman et al. |
| 9,457,730 B2 | 10/2016 | Bernstein et al. |
| 9,463,927 B1 | 10/2016 | Theobald |
| 9,469,477 B1 | 10/2016 | Palamarchuk et al. |
| 9,471,894 B2 | 10/2016 | Palamarchuk et al. |
| 9,481,410 B2 | 11/2016 | Bernstein et al. |
| 9,493,184 B2 | 11/2016 | Castaneda et al. |
| 9,493,303 B2 | 11/2016 | Wurman et al. |
| 9,495,656 B2 | 11/2016 | Adler et al. |
| 9,501,756 B2 | 11/2016 | Stevens et al. |
| 9,511,934 B2 | 12/2016 | Wurman et al. |
| 9,517,899 B2 | 12/2016 | Watt et al. |
| 9,519,284 B2 | 12/2016 | Wurman et al. |
| 9,519,880 B1 | 12/2016 | Cohn |
| 9,522,817 B2 | 12/2016 | Castaneda et al. |
| 9,523,582 B2 | 12/2016 | Chandrasekar et al. |
| 9,527,710 B1 | 12/2016 | Hussain et al. |
| 9,533,828 B1 | 1/2017 | Dwarakanath et al. |
| 9,536,767 B1 | 1/2017 | Adler et al. |
| 9,540,171 B2 | 1/2017 | Elazary et al. |
| 9,547,945 B2 | 1/2017 | Mccabe et al. |
| 9,551,987 B1 | 1/2017 | Mountz et al. |
| 9,563,206 B2 | 2/2017 | Zini et al. |
| 9,568,917 B2 | 2/2017 | Jones et al. |
| 9,582,783 B2 | 2/2017 | Mountz et al. |
| 9,592,961 B2 | 3/2017 | Weiss |
| 9,645,968 B2 | 5/2017 | Elston et al. |
| 9,663,295 B1 | 5/2017 | Wurman et al. |
| 9,663,296 B1 | 5/2017 | Dingle et al. |
| 9,676,552 B2 | 6/2017 | Agarwal et al. |
| 9,679,270 B2 | 6/2017 | Zini et al. |
| 9,694,975 B2 | 7/2017 | Lert et al. |
| 9,694,976 B1 | 7/2017 | Wurman et al. |
| 9,725,239 B2 | 8/2017 | Lert et al. |
| 9,731,896 B2 | 8/2017 | Elazary et al. |
| 9,738,449 B1 | 8/2017 | Palamarchuk et al. |
| 9,740,212 B2 | 8/2017 | D'Andrea et al. |
| 9,766,620 B2 | 9/2017 | Bernstein et al. |
| 9,771,217 B2 | 9/2017 | Lert et al. |
| 9,783,364 B2 | 10/2017 | Worsley |
| 9,785,152 B2 | 10/2017 | Chandrasekar et al. |
| 9,785,911 B2 | 10/2017 | Galluzzo et al. |
| 9,792,577 B2 | 10/2017 | Mountz et al. |
| 9,796,529 B1 | 10/2017 | Hoareau et al. |
| 9,802,762 B1 | 10/2017 | Pikler et al. |
| 9,836,046 B2 | 12/2017 | Wilson et al. |
| 9,841,758 B2 | 12/2017 | Bernstein et al. |
| 9,856,084 B1 | 1/2018 | Palamarchuk et al. |
| 9,873,561 B2 | 1/2018 | Agarwal et al. |
| 11,702,287 B2 | 7/2023 | Jarvis et al. |
| 2001/0018637 A1 | 8/2001 | Hamilton |
| 2001/0027360 A1 | 10/2001 | Nakano et al. |
| 2002/0021954 A1 | 2/2002 | Winkler |
| 2002/0027652 A1 | 3/2002 | Paromtchik et al. |
| 2002/0074172 A1 | 6/2002 | Sugiyama et al. |
| 2002/0165648 A1 | 11/2002 | Zeitler |
| 2003/0046021 A1 | 3/2003 | Lasky et al. |
| 2003/0106731 A1 | 6/2003 | Marino et al. |
| 2003/0208304 A1 | 11/2003 | Peless et al. |
| 2004/0006415 A1 | 1/2004 | Kang |
| 2004/0006416 A1 | 1/2004 | Jeong |
| 2004/0010337 A1 | 1/2004 | Mountz |
| 2004/0010339 A1 | 1/2004 | Mountz |
| 2004/0024489 A1 | 2/2004 | Fujiki et al. |
| 2004/0062419 A1 | 4/2004 | Roh et al. |
| 2004/0093116 A1 | 5/2004 | Mountz |
| 2004/0243278 A1 | 12/2004 | Leishman |
| 2005/0065655 A1 | 3/2005 | Hong et al. |
| 2005/0080524 A1 | 4/2005 | Park |

(56) References Cited

U.S. PATENT DOCUMENTS

| | | |
|---|---|---|
| 2005/0113990 A1 | 5/2005 | Peless et al. |
| 2005/0222722 A1 | 10/2005 | Chen |
| 2005/0228555 A1 | 10/2005 | Roh et al. |
| 2005/0244259 A1 | 11/2005 | Chilson et al. |
| 2006/0071790 A1 | 4/2006 | Duron et al. |
| 2006/0149465 A1 | 7/2006 | Park et al. |
| 2006/0184013 A1 | 8/2006 | Emanuel et al. |
| 2006/0210382 A1 | 9/2006 | Mountz et al. |
| 2006/0245893 A1 | 11/2006 | Schottke |
| 2006/0255948 A1 | 11/2006 | Runyon et al. |
| 2006/0255949 A1 | 11/2006 | Roeder et al. |
| 2006/0255950 A1 | 11/2006 | Roeder et al. |
| 2006/0255951 A1 | 11/2006 | Roeder et al. |
| 2006/0255954 A1 | 11/2006 | Sorenson et al. |
| 2006/0271274 A1 | 11/2006 | Saarikivi |
| 2006/0280585 A1 | 12/2006 | Passeri et al. |
| 2007/0017984 A1 | 1/2007 | Mountz et al. |
| 2007/0021863 A1 | 1/2007 | Mountz et al. |
| 2007/0021864 A1 | 1/2007 | Mountz et al. |
| 2007/0096922 A1 | 5/2007 | Sorenson et al. |
| 2007/0112461 A1 | 5/2007 | Zini et al. |
| 2007/0112463 A1 | 5/2007 | Roh et al. |
| 2007/0123308 A1 | 5/2007 | Kim et al. |
| 2007/0129849 A1 | 6/2007 | Zini et al. |
| 2007/0136152 A1 | 6/2007 | Dunsker et al. |
| 2007/0150109 A1 | 6/2007 | Peless et al. |
| 2007/0152057 A1 | 7/2007 | Cato et al. |
| 2007/0152845 A1 | 7/2007 | Porte et al. |
| 2007/0179690 A1 | 8/2007 | Stewart |
| 2007/0193798 A1 | 8/2007 | Allard et al. |
| 2007/0198144 A1 | 8/2007 | Norris et al. |
| 2007/0198145 A1 | 8/2007 | Norris et al. |
| 2007/0198174 A1 | 8/2007 | Williams et al. |
| 2007/0198175 A1 | 8/2007 | Williams et al. |
| 2007/0198282 A1 | 8/2007 | Williams et al. |
| 2007/0208477 A1 | 9/2007 | Baginski et al. |
| 2007/0219666 A1 | 9/2007 | Filippov et al. |
| 2007/0269299 A1 | 11/2007 | Ross et al. |
| 2007/0288123 A1 | 12/2007 | D'Andrea et al. |
| 2007/0290040 A1 | 12/2007 | Wurman et al. |
| 2007/0293978 A1 | 12/2007 | Wurman et al. |
| 2007/0294029 A1 | 12/2007 | D'Andrea et al. |
| 2007/0297879 A1 | 12/2007 | Yuyama et al. |
| 2008/0001372 A1 | 1/2008 | Hoffman et al. |
| 2008/0051984 A1 | 2/2008 | Wurman et al. |
| 2008/0051985 A1 | 2/2008 | D'Andrea et al. |
| 2008/0071429 A1 | 3/2008 | Kraimer et al. |
| 2008/0077511 A1 | 3/2008 | Zimmerman |
| 2008/0129445 A1 | 6/2008 | Kraimer et al. |
| 2008/0157972 A1 | 7/2008 | Duron et al. |
| 2008/0166217 A1 | 7/2008 | Fontana |
| 2008/0167753 A1 | 7/2008 | Peless et al. |
| 2008/0167884 A1 | 7/2008 | Mountz et al. |
| 2008/0167933 A1 | 7/2008 | Hoffman et al. |
| 2008/0189005 A1 | 8/2008 | Chilson et al. |
| 2008/0199298 A1 | 8/2008 | Chilson et al. |
| 2009/0099716 A1 | 4/2009 | Roh et al. |
| 2009/0138151 A1 | 5/2009 | Smid et al. |
| 2009/0185884 A1 | 7/2009 | Wurman et al. |
| 2009/0198376 A1 | 8/2009 | Friedman et al. |
| 2009/0198381 A1 | 8/2009 | Friedman et al. |
| 2009/0234499 A1 | 9/2009 | Nielsen et al. |
| 2010/0039293 A1 | 2/2010 | Porte et al. |
| 2010/0114405 A1 | 5/2010 | Elston et al. |
| 2010/0127883 A1 | 5/2010 | Chou |
| 2010/0138095 A1 | 6/2010 | Redmann et al. |
| 2010/0141483 A1 | 6/2010 | Thacher et al. |
| 2010/0145551 A1 | 6/2010 | Pulskamp et al. |
| 2010/0234990 A1 | 9/2010 | Zini et al. |
| 2010/0234991 A1 | 9/2010 | Zini et al. |
| 2010/0266381 A1 | 10/2010 | Chilson et al. |
| 2010/0300841 A1 | 12/2010 | O'Brien |
| 2010/0309841 A1 | 12/2010 | Conte |
| 2010/0316468 A1 | 12/2010 | Lert et al. |
| 2010/0316469 A1 | 12/2010 | Lert et al. |
| 2010/0316470 A1 | 12/2010 | Lert et al. |
| 2010/0322746 A1 | 12/2010 | Lert et al. |
| 2010/0322747 A1 | 12/2010 | Lert et al. |
| 2011/0010023 A1 | 1/2011 | Kunzig et al. |
| 2011/0015779 A1 | 1/2011 | D'Andrea et al. |
| 2011/0046813 A1 | 2/2011 | Castaneda et al. |
| 2011/0056760 A1 | 3/2011 | Schendel et al. |
| 2011/0060449 A1 | 3/2011 | Wurman et al. |
| 2011/0066284 A1 | 3/2011 | Curtis |
| 2011/0071718 A1 | 3/2011 | Norris et al. |
| 2011/0103924 A1 | 5/2011 | Watt et al. |
| 2011/0112758 A1 | 5/2011 | D'Andrea et al. |
| 2011/0118903 A1 | 5/2011 | Kraimer et al. |
| 2011/0121068 A1 | 5/2011 | Emanuel et al. |
| 2011/0125312 A1 | 5/2011 | D'Andrea et al. |
| 2011/0130866 A1 | 6/2011 | D'Andrea et al. |
| 2011/0130954 A1 | 6/2011 | D'Andrea et al. |
| 2011/0137457 A1 | 6/2011 | Zini et al. |
| 2011/0153063 A1 | 6/2011 | Wurman et al. |
| 2011/0160949 A1 | 6/2011 | Kondo |
| 2011/0163160 A1 | 7/2011 | Zini et al. |
| 2011/0166721 A1 | 7/2011 | Castaneda et al. |
| 2011/0166737 A1 | 7/2011 | Tanaka et al. |
| 2011/0191135 A1 | 8/2011 | Williams et al. |
| 2011/0208745 A1 | 8/2011 | Dietsch et al. |
| 2011/0270438 A1 | 11/2011 | Shimamura |
| 2012/0038455 A1 | 2/2012 | Kraimer et al. |
| 2012/0041677 A1 | 2/2012 | D'Andrea et al. |
| 2012/0046820 A1 | 2/2012 | Allard et al. |
| 2012/0078471 A1 | 3/2012 | Siefring et al. |
| 2012/0139715 A1 | 6/2012 | Yamazato |
| 2012/0143427 A1 | 6/2012 | Hoffman et al. |
| 2012/0168240 A1 | 7/2012 | Wilson et al. |
| 2012/0168241 A1 | 7/2012 | Bernstein et al. |
| 2012/0173047 A1 | 7/2012 | Bernstein et al. |
| 2012/0173048 A1 | 7/2012 | Bernstein et al. |
| 2012/0173049 A1 | 7/2012 | Bernstein et al. |
| 2012/0173050 A1 | 7/2012 | Bernstein et al. |
| 2012/0176222 A1 | 7/2012 | Baek et al. |
| 2012/0176491 A1 | 7/2012 | Garin et al. |
| 2012/0197477 A1 | 8/2012 | Colwell |
| 2012/0232739 A1 | 9/2012 | Takahashi et al. |
| 2012/0239191 A1 | 9/2012 | Versteeg et al. |
| 2012/0239224 A1 | 9/2012 | Mccabe et al. |
| 2012/0239238 A1 | 9/2012 | Harvey et al. |
| 2012/0255810 A1 | 10/2012 | Yang |
| 2012/0282070 A1 | 11/2012 | D'Andrea et al. |
| 2012/0321423 A1 | 12/2012 | Macknight et al. |
| 2012/0323746 A1 | 12/2012 | Mountz et al. |
| 2012/0330458 A1 | 12/2012 | Weiss |
| 2012/0330492 A1 | 12/2012 | Douglas et al. |
| 2013/0006442 A1 | 1/2013 | Williams et al. |
| 2013/0054005 A1 | 2/2013 | Stevens et al. |
| 2013/0058743 A1 | 3/2013 | Rebstock |
| 2013/0103185 A1 | 4/2013 | Wurman et al. |
| 2013/0103552 A1 | 4/2013 | Hoffman et al. |
| 2013/0105570 A1 | 5/2013 | Dunsker et al. |
| 2013/0110279 A1 | 5/2013 | Dunsker et al. |
| 2013/0110281 A1 | 5/2013 | Jones et al. |
| 2013/0124013 A1 | 5/2013 | Elston et al. |
| 2013/0124014 A1 | 5/2013 | Elston et al. |
| 2013/0131895 A1 | 5/2013 | Elston et al. |
| 2013/0131910 A1 | 5/2013 | Takahashi et al. |
| 2013/0158773 A1 | 6/2013 | Wu et al. |
| 2013/0166108 A1 | 6/2013 | Sturm |
| 2013/0173049 A1 | 7/2013 | Brunner et al. |
| 2013/0173089 A1 | 7/2013 | Bernstein et al. |
| 2013/0190963 A1 | 7/2013 | Kuss et al. |
| 2013/0197720 A1 | 8/2013 | Kraimer et al. |
| 2013/0197760 A1 | 8/2013 | Castaneda et al. |
| 2013/0204429 A1 | 8/2013 | D'Andrea et al. |
| 2013/0204480 A1 | 8/2013 | D'Andrea et al. |
| 2013/0211626 A1 | 8/2013 | Nagasawa |
| 2013/0238170 A1 | 9/2013 | Klinger |
| 2013/0246229 A1 | 9/2013 | Mountz et al. |
| 2013/0251480 A1 | 9/2013 | Watt et al. |
| 2013/0275045 A1 | 10/2013 | Tsujimoto et al. |
| 2013/0282222 A1 | 10/2013 | Ozaki et al. |
| 2013/0297151 A1 | 11/2013 | Castaneda et al. |

(56) References Cited

U.S. PATENT DOCUMENTS

| | | |
|---|---|---|
| 2013/0302132 A1 | 11/2013 | D'Andrea |
| 2013/0304253 A1 | 11/2013 | Wurman et al. |
| 2013/0312371 A1 | 11/2013 | Ambrose |
| 2013/0325243 A1 | 12/2013 | Lipkowski et al. |
| 2013/0338874 A1 | 12/2013 | Donahue |
| 2013/0338885 A1 | 12/2013 | Kirk et al. |
| 2013/0338886 A1 | 12/2013 | Callea et al. |
| 2014/0005933 A1 | 1/2014 | Fong et al. |
| 2014/0020964 A1 | 1/2014 | Bernstein et al. |
| 2014/0032035 A1 | 1/2014 | Thomson |
| 2014/0067184 A1 | 3/2014 | Murphy |
| 2014/0072392 A1 | 3/2014 | Tanahashi |
| 2014/0081505 A1 | 3/2014 | Klinger et al. |
| 2014/0088758 A1 | 3/2014 | Lert et al. |
| 2014/0100690 A1 | 4/2014 | Wurman et al. |
| 2014/0100715 A1 | 4/2014 | Mountz et al. |
| 2014/0100998 A1 | 4/2014 | Mountz et al. |
| 2014/0100999 A1 | 4/2014 | Mountz et al. |
| 2014/0107833 A1 | 4/2014 | Segawa et al. |
| 2014/0124462 A1 | 5/2014 | Yamashita |
| 2014/0135977 A1 | 5/2014 | Wurman et al. |
| 2014/0172223 A1 | 6/2014 | Murphy |
| 2014/0188671 A1 | 7/2014 | Mountz et al. |
| 2014/0195040 A1 | 7/2014 | Wurman et al. |
| 2014/0195121 A1 | 7/2014 | Castaneda et al. |
| 2014/0214195 A1 | 7/2014 | Worsley |
| 2014/0214196 A1 | 7/2014 | Worsley |
| 2014/0214234 A1 | 7/2014 | Worsley |
| 2014/0228999 A1 | 8/2014 | D'Andrea et al. |
| 2014/0236393 A1 | 8/2014 | Bernstein et al. |
| 2014/0236413 A1 | 8/2014 | D'Andrea et al. |
| 2014/0238762 A1 | 8/2014 | Berberian et al. |
| 2014/0244097 A1 | 8/2014 | Colwell |
| 2014/0271063 A1 | 9/2014 | Lert et al. |
| 2014/0277691 A1 | 9/2014 | Jacobus et al. |
| 2014/0297093 A1 | 10/2014 | Murai et al. |
| 2014/0303773 A1 | 10/2014 | Wurman et al. |
| 2014/0330425 A1 | 11/2014 | Stevens et al. |
| 2014/0330426 A1 | 11/2014 | Brunner et al. |
| 2014/0343714 A1 | 11/2014 | Clark et al. |
| 2014/0343758 A1 | 11/2014 | Kraimer et al. |
| 2014/0345957 A1 | 11/2014 | Bernstein et al. |
| 2014/0350768 A1 | 11/2014 | Filippov et al. |
| 2014/0350831 A1 | 11/2014 | Hoffman et al. |
| 2014/0371973 A1 | 12/2014 | Pfaff et al. |
| 2015/0012209 A1 | 1/2015 | Park et al. |
| 2015/0019043 A1 | 1/2015 | Creasey et al. |
| 2015/0022400 A1 | 1/2015 | Smid et al. |
| 2015/0025713 A1 | 1/2015 | Klinger et al. |
| 2015/0057843 A1 | 2/2015 | Kraimer et al. |
| 2015/0066283 A1 | 3/2015 | Wurman et al. |
| 2015/0073586 A1 | 3/2015 | Weiss |
| 2015/0073589 A1 | 3/2015 | Khodl et al. |
| 2015/0088302 A1 | 3/2015 | Mountz et al. |
| 2015/0117995 A1 | 4/2015 | D'Andrea |
| 2015/0142168 A1 | 5/2015 | Holland et al. |
| 2015/0151912 A1 | 6/2015 | Mountz et al. |
| 2015/0183581 A1 | 7/2015 | Worsley |
| 2015/0224941 A1 | 8/2015 | Bernstein et al. |
| 2015/0226560 A1 | 8/2015 | Chandrasekar et al. |
| 2015/0226561 A1 | 8/2015 | Chandrasekar et al. |
| 2015/0227862 A1 | 8/2015 | Chandrasekar et al. |
| 2015/0227885 A1 | 8/2015 | Zini et al. |
| 2015/0234386 A1 | 8/2015 | Zini et al. |
| 2015/0261223 A1 | 9/2015 | Fong et al. |
| 2015/0266672 A1 | 9/2015 | Lert et al. |
| 2015/0284010 A1 | 10/2015 | Beardsley et al. |
| 2015/0286218 A1 | 10/2015 | Shani |
| 2015/0301532 A1 | 10/2015 | Norris et al. |
| 2015/0307278 A1 | 10/2015 | Wickham et al. |
| 2015/0344085 A1 | 12/2015 | Bernstein et al. |
| 2015/0355639 A1 | 12/2015 | Versteeg et al. |
| 2015/0362919 A1 | 12/2015 | Bernstein et al. |
| 2015/0370257 A1 | 12/2015 | Bernstein et al. |
| 2015/0371181 A1 | 12/2015 | Palamarchuk et al. |
| 2016/0004253 A1 | 1/2016 | Bernstein et al. |
| 2016/0021178 A1 | 1/2016 | Liu et al. |
| 2016/0033967 A1 | 2/2016 | Bernstein et al. |
| 2016/0033971 A1 | 2/2016 | Thomson |
| 2016/0042314 A1 | 2/2016 | Mountz et al. |
| 2016/0048130 A1 | 2/2016 | Vavrick |
| 2016/0054734 A1 | 2/2016 | Bernstein et al. |
| 2016/0069691 A1 | 3/2016 | Fong et al. |
| 2016/0090133 A1 | 3/2016 | Bernstein et al. |
| 2016/0097862 A1 | 4/2016 | Yim |
| 2016/0101741 A1 | 4/2016 | Bernstein et al. |
| 2016/0101937 A1 | 4/2016 | Adler et al. |
| 2016/0103014 A1 | 4/2016 | Mundhenke et al. |
| 2016/0117936 A1 | 4/2016 | Klinger et al. |
| 2016/0147231 A1 | 5/2016 | Sun et al. |
| 2016/0171441 A1 | 6/2016 | Lively et al. |
| 2016/0176637 A1 | 6/2016 | Ackerman et al. |
| 2016/0185526 A1 | 6/2016 | Lert et al. |
| 2016/0187886 A1 | 6/2016 | Jones et al. |
| 2016/0202696 A1 | 7/2016 | Bernstein et al. |
| 2016/0203543 A1 | 7/2016 | Snow |
| 2016/0232477 A1 | 8/2016 | Cortes et al. |
| 2016/0232490 A1 | 8/2016 | Mountz et al. |
| 2016/0246299 A1 | 8/2016 | Berberian et al. |
| 2016/0264357 A1 | 9/2016 | Agarwal et al. |
| 2016/0282871 A1 | 9/2016 | Bernstein et al. |
| 2016/0291591 A1 | 10/2016 | Bernstein et al. |
| 2016/0304280 A1 | 10/2016 | Elazary et al. |
| 2016/0304281 A1 | 10/2016 | Elazary et al. |
| 2016/0334799 A1 | 11/2016 | D'Andrea et al. |
| 2016/0339587 A1 | 11/2016 | Rublee |
| 2016/0347545 A1 | 12/2016 | Lindbo et al. |
| 2016/0349748 A1 | 12/2016 | Bernstein et al. |
| 2016/0379161 A1 | 12/2016 | Adler et al. |
| 2017/0011336 A1 | 1/2017 | Stevens et al. |
| 2017/0022010 A1 | 1/2017 | D'Andrea et al. |
| 2017/0038770 A1 | 2/2017 | Wurman et al. |
| 2017/0043953 A1 | 2/2017 | Battles et al. |
| 2017/0052033 A1 | 2/2017 | Fong et al. |
| 2017/0057798 A1 | 3/2017 | Dues et al. |
| 2017/0060138 A1 | 3/2017 | Chandrasekar et al. |
| 2017/0080352 A1 | 3/2017 | Bernstein et al. |
| 2017/0174431 A1 | 6/2017 | Borders et al. |
| 2017/0183005 A1 | 6/2017 | Elston et al. |
| 2017/0183159 A1 | 6/2017 | Weiss |
| 2017/0269608 A1 | 9/2017 | Chandrasekar et al. |
| 2017/0286908 A1 | 10/2017 | Lively et al. |
| 2017/0313517 A1 | 11/2017 | Agarwal et al. |
| 2017/0362032 A1 | 12/2017 | Sullivan et al. |
| 2018/0016098 A1 | 1/2018 | Lert et al. |
| 2019/0033837 A1 | 1/2019 | Zanger et al. |
| 2020/0207546 A1 | 7/2020 | Borders et al. |
| 2021/0147147 A1 | 5/2021 | Durai et al. |
| 2024/0367907 A1 | 11/2024 | Jarvis et al. |

FOREIGN PATENT DOCUMENTS

| | | |
|---|---|---|
| CA | 1228142 A | 10/1987 |
| CA | 1238103 A | 6/1988 |
| CA | 1264490 A | 1/1990 |
| CA | 1267866 A | 4/1990 |
| CA | 1269740 A | 5/1990 |
| CA | 1271544 A | 7/1990 |
| CA | 1275721 C | 10/1990 |
| CA | 1276264 C | 11/1990 |
| CA | 2029773 A1 | 5/1991 |
| CA | 1291725 C | 11/1991 |
| CA | 2036104 A1 | 11/1991 |
| CA | 2042133 A1 | 1/1992 |
| CA | 2049578 A1 | 2/1992 |
| CA | 2296837 A1 | 2/1992 |
| CA | 2094833 A1 | 4/1992 |
| CA | 1304043 C | 6/1992 |
| CA | 2095442 A1 | 6/1992 |
| CA | 1304820 C | 7/1992 |
| CA | 1323084 C | 10/1993 |
| CA | 2189853 A1 | 11/1995 |
| CA | 2244668 A1 | 3/1999 |
| CA | 2469652 A1 | 6/2003 |

(56) References Cited

FOREIGN PATENT DOCUMENTS

| | | |
|---|---|---|
| CA | 2514523 A1 | 8/2004 |
| CA | 2565553 A1 | 11/2005 |
| CA | 2577346 A1 | 4/2006 |
| CA | 2613180 A1 | 1/2007 |
| CA | 2921584 A1 | 1/2007 |
| CA | 2625885 A1 | 4/2007 |
| CA | 2625895 A1 | 4/2007 |
| CA | 2837477 A1 | 4/2007 |
| CA | 2864027 A1 | 4/2007 |
| CA | 2636233 A1 | 7/2007 |
| CA | 2640769 A1 | 8/2007 |
| CA | 2652114 A1 | 12/2007 |
| CA | 2654258 A1 | 12/2007 |
| CA | 2654260 A1 | 12/2007 |
| CA | 2654263 A1 | 12/2007 |
| CA | 2654295 A1 | 12/2007 |
| CA | 2654336 A1 | 12/2007 |
| CA | 2654471 A1 | 12/2007 |
| CA | 2748398 A1 | 12/2007 |
| CA | 2748407 A1 | 12/2007 |
| CA | 2750043 A1 | 12/2007 |
| CA | 2781624 A1 | 12/2007 |
| CA | 2781857 A1 | 12/2007 |
| CA | 2838044 A1 | 12/2007 |
| CA | 2866664 A1 | 12/2007 |
| CA | 2921134 A1 | 12/2007 |
| CA | 2663578 A1 | 4/2008 |
| CA | 2860745 A1 | 4/2008 |
| CA | 2671955 A1 | 7/2008 |
| CA | 2673025 A1 | 7/2008 |
| CA | 2674241 A1 | 7/2008 |
| CA | 2691710 A1 | 12/2008 |
| CA | 2721345 A1 | 10/2009 |
| CA | 2760127 A1 | 11/2009 |
| CA | 2760225 A1 | 11/2009 |
| CA | 2743706 A1 | 6/2010 |
| CA | 2754626 A1 | 9/2010 |
| CA | 2765565 A1 | 1/2011 |
| CA | 2932535 A1 | 1/2011 |
| CA | 2932537 A1 | 1/2011 |
| CA | 2770139 A1 | 2/2011 |
| CA | 2773963 A1 | 3/2011 |
| CA | 2778111 A1 | 5/2011 |
| CA | 2784874 A1 | 7/2011 |
| CA | 2868578 A1 | 7/2011 |
| CA | 2806852 A1 | 2/2012 |
| CA | 2823715 A1 | 7/2012 |
| CA | 2827281 A1 | 8/2012 |
| CA | 2827735 A1 | 8/2012 |
| CA | 2770715 A1 | 9/2012 |
| CA | 2770918 A1 | 9/2012 |
| CA | 2831832 A1 | 10/2012 |
| CA | 2836933 A1 | 12/2012 |
| CA | 2851774 A1 | 4/2013 |
| CA | 2799871 A1 | 6/2013 |
| CA | 2866708 A1 | 9/2013 |
| CA | 2938894 A1 | 9/2013 |
| CA | 2813874 A1 | 12/2013 |
| CA | 2824189 A1 | 2/2014 |
| CA | 2870381 A1 | 4/2014 |
| CA | 2935223 A1 | 4/2014 |
| CA | 2894546 A1 | 6/2014 |
| CA | 2845229 A1 | 9/2014 |
| CA | 2899553 A1 | 10/2014 |
| CA | 2882452 A1 | 8/2015 |
| CA | 2886121 A1 | 10/2015 |
| WO | 2012/154872 A2 | 11/2012 |
| WO | 2016/015000 A2 | 1/2016 |

OTHER PUBLICATIONS

US 9,050,932 B2, 06/2015, Bernstein et al. (withdrawn)
US 9,342,073 B2, 05/2016, Bernstein et al. (withdrawn)
US 9,791,858 B2, 10/2017, Wilson et al. (withdrawn)
European Search Report and Search Opinion Received for EP Application No. 17857594, mailed on Apr. 1, 2020, 9 pages.
International Preliminary Report on Patentability received for PCT Patent Application No. PCT/US17/54627, mailed on Apr. 11, 2019, 9 pages.
International Preliminary Report on Patentability received for PCT Patent Application No. PCT/US18/12641, mailed on Jul. 18, 2019, 10 pages.
International Preliminary Report on Patentability received for PCT Patent Application No. PCT/US18/12645, mailed on Jul. 18, 2019, 11 pages.
International Search Report and Written Opinion received for PCT Patent Application No. PCT/US17/54627, mailed on Jan. 5, 2018, 9 pages.
International Search Report and Written Opinion received for PCT Patent Application No. PCT/US18/12641, mailed on Mar. 7, 2018, 10 pages.
International Search Report and Written Opinion received for PCT Patent Application No. PCT/US18/12645, mailed on Mar. 7, 2018, 12 pages.
US 7,460,017, 12/2008, (withdrawn)
US 9,050,932, 06/2015, (withdrawn)
US 9,342,073 B2, 05/2016, Bernstein et al. (withdrawn)
US 9,791,858 B2, 10/2017, Wilson et al. (withdrawn)
Warehouse Robots at Work, IEEE Spectrum, Jul. 21, 2008. YouTube https://www.youtube.com/watch?v=IWsMdN7HMuA. (see attached PDF screenshots).

HYBRID MODULAR STORAGE FETCHING SYSTEM

CROSS-REFERENCE TO RELATED APPLICATIONS

This application is a continuation of U.S. application Ser. No. 16/809,361, entitled "Hybrid Modular Storage Fetching System," filed Mar. 4, 2020, which is a continuation of U.S. application Ser. No. 15/863,050, entitled "Hybrid Modular Storage Fetching System," filed Jan. 5, 2018, which is a continuation-in-part of U.S. application Ser. No. 15/721,472, entitled "Hybrid Modular Storage Fetching System," filed Sep. 29, 2017, which claims the benefit under 35 U.S.C. § 119(e) of U.S. Provisional Application No. 62/403,001, entitled "Modular Storage Fetching System (MSFS)," filed on Sep. 30, 2016, the entire contents of each of which are incorporated herein by reference. U.S. application Ser. No. 15/863,050 also claims the benefit under 35 U.S.C. § 119(e) of U.S. Provisional Application No. 62/442,891, entitled "Modular Storage Fetching System (MSFS)," filed on Jan. 5, 2017, the entire contents of which are incorporated herein by reference.

BACKGROUND

This application relates to inventory management systems (e.g., order distribution or fulfillment systems).

Some current inventory management systems use drag-along carts on which human agents (pickers) place items they select (pick) to fulfill orders. In a zone-less pick-to-cart system, an agent drags his/her cart from location to location as instructed by the computer system of the facility. The cart can accommodate multiple orders and typically is equipped with dedicated containers or cartons that are keyed to the orders being fulfilled by the agent during that cart load. In some cases, the agent wears a headset and/or is provided a terminal, such as a mobile computing device, via which the agent is provided ordered, item-by-item instructions on which items to pick. As the agent walks around the facility among the different fixed shelving units, he/she drags or pushes his/her cart manually. During a given shift, the agent may end up considerably fatigued from having to propel the cart around the warehouse.

Further, some current inventory management systems divide inventory into a series of zones and assign a human agent to a zone. The systems may use a conveyor belt to move orders across the zones as controlled by the computer system of the facility. In some cases, the agent wears a headset and/or is provided a terminal, such as a mobile computing device, via which the agent is provided ordered, item-by-item instructions on which items to pick. In some cases, pick-to-light systems use light displays to direct operators to product locations. Each product location may have a numeric or alphanumeric display with a light, an acknowledgement button, and a digital readout for indicating quantity.

Further, some current inventory management or distribution systems use a "goods-to-person" approach where the items to be picked by a human agent are brought to a predetermined location to eliminate the amount of walking the human agent must do within a facility and/or expedite the picking of the items by the picker. Once picked, these items are packaged and dispatched. While these systems may, in certain use cases, adequately maneuver the items to the stations at which they are to be picked, they are less effective for high-volume and/or high-velocity goods because they have to continually return the same goods to the picking stations during the course of a day.

Some current inventory management or distribution systems that use a "goods-to-person" approach using robots to retrieve items to be picked from storage. For example, in these systems, robots may retrieve entire shelving units from storage and bring them to agents, who pick items from the shelving units. However, these robots bring many more items in the shelving units to the agents than are actually picked by the agents. Further, each robot can only retrieve items in a single shelving unit at a time because they bring entire shelving units to the agents.

Some current inventory management or distribution systems use forklifts to move pallets of items, however this solution is not practical when fulfilling small orders, because small orders may include, for instance, only a few items while a pallet may include tens or hundreds of items. Further, traditional forklifts are not able to navigate through narrow aisles to retrieve items on shelves in those aisles, because traditional forklifts require substantial space to turn to face a shelving unit to retrieve a pallet.

SUMMARY

A hybrid modular storage fetching system with a robot execution system (REX) is described. Implementations of the REX may perform the following operations. Inducting an order into a REX in response to receiving, by the REX, order data identifying items in the order to be fulfilled at an order fulfillment facility, the REX including one or more computing devices that communicate with a plurality of automated guided vehicles ("AGV"s) in the order fulfillment facility, the order fulfillment facility including an operating environment with a first storage area storing a first set of items, a second storage area storing a second set of items, and a pick-cell station at which one or more selected items from one or more of the first storage area and the second storage area are placed into a carton; generating, by the REX, a task list including tasks for fulfilling the order using a cart AGV of the plurality of AGVs and a picking AGV of the plurality of AGVs; instructing, by the REX, the cart AGV to retrieve a first item of the order from the first storage area based on the task list, the first item being in the first set of items; instructing, by the REX, the cart AGV to deliver the first item to the pick-cell station; instructing, by the REX, the picking AGV to retrieve a second item of the order from the second storage area, the second item being in the second set of items; and instructing, by the REX, the picking AGV to deliver the second item to the pick-cell station.

Implementations of the method may include one or more of the following features. The method where inducting the order into the REX includes: receiving, by the REX, a message from a warehouse management system ("WMS"), the message including the order data and labels assigned to a cart, the labels representing one or more orders including the order; and storing, by the REX, the labels in association with a connectable cart in a database. The method where inducting the order into the REX includes: instructing, by the REX, the cart AGV to couple to the connectable cart, and outputting, by the REX, a dashboard embodied by a graphical interface presented on the one or more computing devices to indicate that the connectable cart is coupled with the cart AGV and the labels have been assigned to the connectable cart. The method where inducting the order into the REX includes: receiving, by the REX, a input from a cart picker into the dashboard, the input indicating to release the cart AGV from an induction area of the operating environment; and instructing, by the REX, the cart AGV to navigate to a location of the first item in the first storage area in response to receiving the input by the cart picker and based on the task list. The method further including: receiving, by the REX, a confirmation message indicating that the first item has been picked from the first storage area to the cart AGV; and updating, by the REX, the task list to indicate that the first item has been picked from the first storage area to the cart AGV. The method further including: determining, by the REX, whether an additional item is assigned to be picked to the cart AGV based on the task list, the additional item being located in the first storage area; in response to determining, by the REX, that the additional item is assigned to be picked to the cart AGV, instructing the cart AGV to navigate to a location of the additional item in the first storage area; and in response to determining, by the REX, that no additional item is assigned to be picked to the cart AGV, instructing the cart AGV to navigate to the pick-cell station. The method further including: selecting, by the REX, the pick-cell station from a plurality of pick-cell stations in the operating environment based on a queue of cart AGVs at the plurality of pick-cell stations. The method further including: determining, by the REX, whether the pick-cell station is available for receiving the cart AGV; in response to determining, by the REX, that the pick-cell station is not available for receiving the cart AGV, signaling a pick-cell picker in the pick-cell station to stay in the pick-cell station, and instructing the cart AGV to wait in a queue for the pick-cell station; and in response to determining, by the REX, that the pick-cell station is available for receiving the cart AGV, instructing the cart AGV to navigate to the pick-cell station; and outputting instructions, via an output device of the one or more computing devices, to the pick-cell picker at the pick-cell station, the instructions indicating to place the second item in the carton along with the first item. The method further including: receiving, by the REX, a confirmation message indicating that the pick-cell picker has placed the second item in the carton along with the first item; and in response to receiving the confirmation message, instructing, by the REX, the cart AGV to navigate to a finalizing area of the operating environment, and detach a connectable cart coupled with the cart AGV at the finalizing area. The method further including: receiving, by the REX, a confirmation message indicating that the pick-cell picker has placed the second item in the carton along with the first item; and in response to receiving the confirmation message, instructing one of the picking AGV and a second picking AGV to retrieve a container from the pick-cell station, the second item having been held in the container during delivery to the pick-cell station by the picking AGV, transport the container to the second storage area, and place the container on a storage shelf in the second storage area. The method where the cart AGV includes a drive unit that provides motive force to the cart AGV and a guidance system that locates the cart AGV in the order fulfillment facility, the cart AGV autonomously transporting cartons, the cartons holding one or more items from the first set of items during transport of the one or more items by the cart AGV. The method where the picking AGV includes a drive unit that provides motive force to the picking AGV, a guidance system that locates the picking AGV in the order fulfillment facility, and a container retrieval mechanism that retrieves containers from a first shelf in the second storage area, transports the containers to the pick-cell station, and places the containers on a second shelf at the pick-cell station.

Another general aspect includes a system including: a plurality of AGVs including a cart AGV and a picking AGV; a REX that communicates with the plurality of AGVs, the REX including one or more processors and a memory storing instructions that, when executed by the one or more processors, cause the REX to: induct an order into the REX in response to receiving order data identifying items in the order to be fulfilled at an order fulfillment facility, the REX including one or more computing devices that communicate with a plurality of AGVs in the order fulfillment facility, the order fulfillment facility including an operating environment with a first storage area storing a first set of items, a second storage area storing a second set of items, and a pick-cell station at which one or more selected items from one or more of the first storage area and the second storage area are placed into a carton; generate a task list including tasks for fulfilling the order using the cart AGV and the picking AGV; instruct the cart AGV to retrieve a first item of the order from the first storage area based on the task list, the first item being in the first set of items; instruct the cart AGV to deliver the first item to the pick-cell station; instruct the picking AGV to retrieve a second item of the order from the second storage area, the second item being in the second set of items; and instruct the picking AGV to deliver the second item to the pick-cell station.

Implementations of the item handling and storage mechanism may include one or more of the following features. The system where the instructions further cause the REX to: determine whether an additional item is assigned to be picked to the cart AGV based on the task list, the additional item being located in the first storage area; instruct the cart AGV to navigate to a location of the additional item in the first storage area in response to determining that the additional item is assigned to be picked to the cart AGV; and instruct the cart AGV to navigate to the pick-cell station in response to determining that no additional item is assigned to be picked to the cart AGV. The system where the instructions further cause the REX to: determine whether the pick-cell station is available for receiving the cart AGV; in response to determining that the pick-cell station is not available for receiving the cart AGV, signal a pick-cell picker in the pick-cell station to stay in the pick-cell station, and instruct the cart AGV to wait in a queue for the pick-cell station; and in response to determining that the pick-cell station is available for receiving the cart AGV, instruct the cart AGV to navigate to the pick-cell station; and output instructions, via an output device of the one or more computing devices, to the pick-cell picker at the pick-cell station, the instructions indicating to place the second item in the carton along with the first item. The system where the instructions further cause the REX to: receive a confirmation message indicating that the pick-cell picker has placed the second item in the carton along with the first item; and in response to receiving the confirmation message, instruct the cart AGV to navigate to a finalizing area of the operating environment, and detach a connectable cart coupled with the cart AGV at the finalizing area. The system where the instructions further cause the REX to: receive a confirmation message indicating that the pick-cell picker has placed the second item in the carton along with the first item; and in response to receiving the confirmation message, instruct one of the picking AGV and a second picking AGV to retrieve a container from the pick-cell station, the second item having been held in the container during delivery to the pick-cell station by the picking AGV, transport the container to the second storage area, and place the container on a storage shelf in the second storage area. The system where the cart AGV includes a drive unit that provides motive force to the cart AGV and a guidance system that locates the cart AGV in the order fulfillment facility, the cart AGV autonomously transporting cartons, the cartons holding one or more items from the first set of items during transport of the one or more items by the cart AGV. The system where the picking AGV includes a drive unit that provides motive force to the picking AGV, a guidance system that locates the picking AGV in the order fulfillment facility, and a container retrieval mechanism that retrieves containers from a first shelf in the second storage area, transports the containers to the pick-cell station, and places the containers on a second shelf at the pick-cell station.

Another general aspect includes a method including: receiving an induction instruction from a warehouse management system, the induction instruction indicating a first item to be picked using a cart AGV and a second item to be picked using a picking AGV; instructing the cart AGV to connect to connectable cart; receiving a first confirmation from one or more picker computing devices that the cart AGV is connected to the connectable cart; selecting a pick-cell station from among a plurality of pick-cell stations; instructing the cart AGV to propel the connectable cart to a location of the first item; receiving a second confirmation from the one or more picker computing devices that the first item has been picked to the connectable cart; instructing the cart AGV to propel the connectable cart to the pick-cell station; instructing the picking AGV to navigate to a second location of the second item; retrieve the second item from a storage shelf at the second location; and navigate to the pick-cell station; presenting, for display on the one or more picker computing devices to a pick-cell picker, an instruction to place the first item and the second item in a designated carton on the connectable cart; receiving a third confirmation from the one or more picker computing devices that the first item and the second item have been placed in the designated carton; and instructing the cart AGV to propel the connectable cart to a finalizing area and detach from the connectable cart in the finalizing area.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

Figure 1:
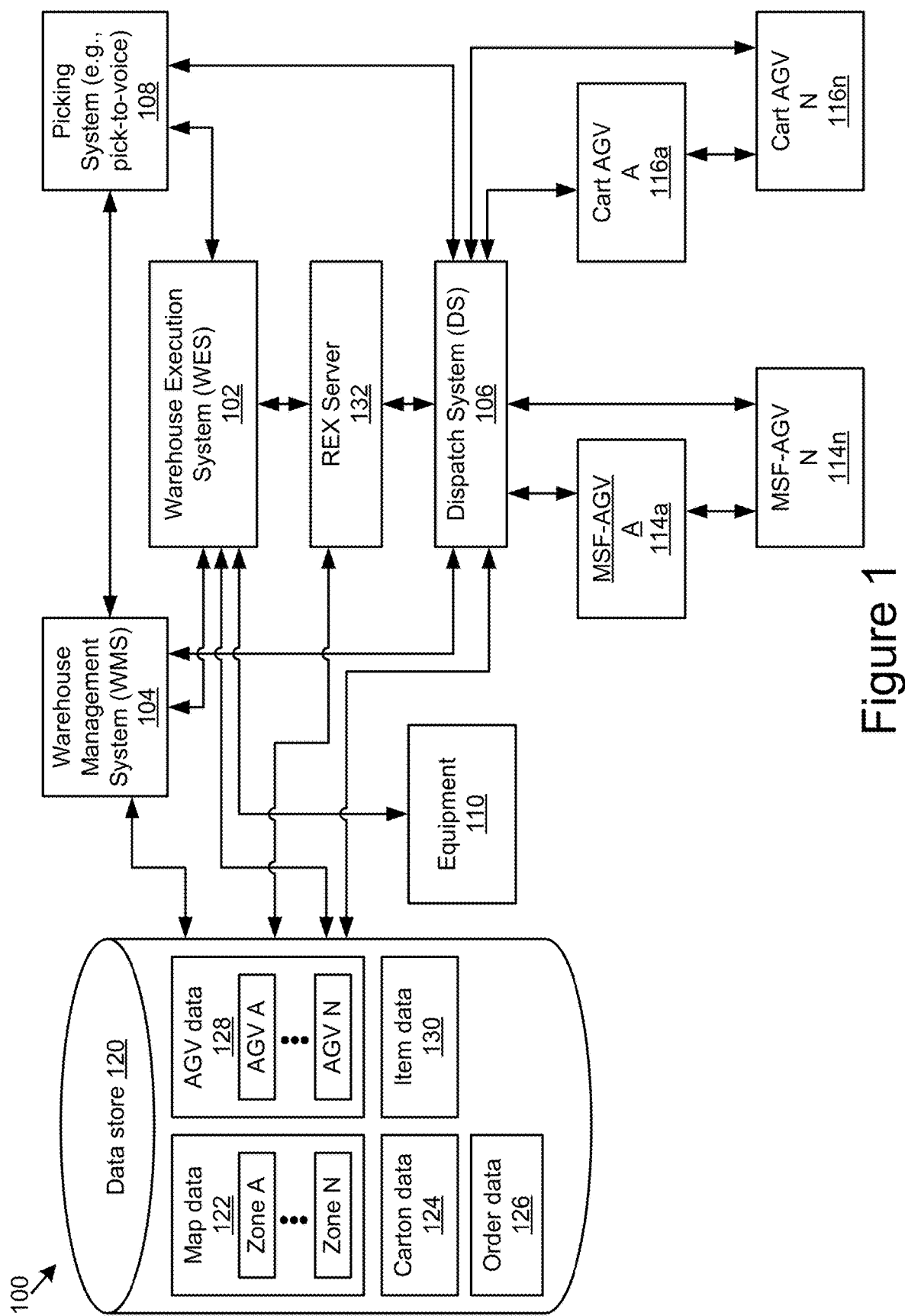
FIG. 1 is a block diagram of an example system and data communication flow for a hybrid modular storage fetching system.

Among other benefits, the technology described herein improves upon that described in the Background Section. For instance, the technology provides robotic devices, systems, methods, and other aspects that can more efficiently process goods (e.g., items or items in an order fulfillment facility) based on demand.

Features of the technology described herein can be integrated into a logistics system, dispatch system 106, warehouse execution system 102, warehouse management system 104, a robot execution server 132, etc., to coordinate the provision of to-be-picked items in a hybrid modular storage fetching system. This technology beneficially improves productivity and throughput, increases asset utilization, and lowers cycle time and labor costs. These benefits, in turn, lead to shorter delivery times and result in significant savings and business value.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 depicts an example system 100 and data communication flow for implementing a hybrid modular storage fetching system. The system 100 includes a warehouse execution system (WES) 102. The WES 102 is coupled to equipment 110 (e.g., conveyor controls, conveyor scanners, conveyors, automated induction equipment, other warehouse equipment, etc.), a warehouse management system (WMS) 104, a data store 120 storing warehouse management, execution, dispatch, picking, carton, order, item, AGV, map, and/or other data, a picking system 108 (e.g., pick-to-voice, pick-to-light, etc.), a robot execution system or server (REX) 132, and a dispatch system 106.

The WES 102 may, in some implementations, include one or more hardware and/or virtual servers programmed to perform the operations, acts, and/or functionality described herein. The components of the WES 102 may comprise software routines storable in one or more non-transitory memory devices and executable by one or more computer processors of the WES 102 to carry out the operations, acts, and/or functionality described herein. In further implementations, these routines, or a portion thereof, may be embodied in electrical hardware that is operable to carry out the operations, acts, and/or functionality described herein.

The REX 132 may, in some implementations, include one or more hardware and/or virtual servers programmed to perform the operations, acts, and/or functionality described herein. For example, the REX 132 may include a picking agent that dynamically manages picking AGVs 114, a cart agent that dynamically manages cart AGVs 116, a management module that retrieves and stores information regarding AGV location, cartons, modular storage units 702, etc., in the data store 120, and an interface unit that interfaces with the other components of the system 100, according to the techniques described herein. The REX 132 may optimize workflow of picking AGVs 114 and cart AGVs 116, and dynamically manage resources and inventory, in conjunction with the WES 102, WMS 104, and dispatch system 106, etc., as described herein.

In some implementations, the REX 132 may generate a schedule or task list that defines the route for one or more AGVs during a picking session. The REX 132 may generate a task list, schedule, or other command and transmit it to the dispatch system 106, which in turn deploys one or more picking AGV(s) 114 and/or a cart AGV(s) 116 according to the schedule, for instance, depending on items to be picked from a high-density storage area 304 and/or pick-to-cart area 302. In some implementations, the dispatch system 106, based on instruction from the REX 132, instructs the AGVs to proceed through one or more of the picking zones of the order fulfillment facility according to the schedule. The schedule of the AGVs may be coordinated such that an optimal flow can be achieved, as discussed elsewhere herein.

In some implementations, the REX 132 may include or may communicate with a SKU (e.g., a stock keeping unit or unique identifier identifying an item) routing engine. The SKU routing engine is executable to route items into different storage zones depending based on picking profiles of the items, which may be stored and maintained as item data 130. The SKU routing engine dynamically monitors the picking activity in the order fulfillment facility, tracks which items have the highest volume or velocity for a given timeframe, stores the tracking data in the data store 120, and can instruct the REX 132 to have items relocated by AGVs to different storage locations in the order fulfillment facility based on the tracked picking activity.

A picking profile of a given item can change over time as demand for the item changes. The demand for a given item may be random or predicable (e.g., seasonal), and may change based on time of day, week, month, year, etc. The item routing engine may maintain the picking profile in the database as item data 130, and utilize that data to determine in which zone of the order fulfillment facility to store the item.

Advantageously, based on the picking profiles (e.g., velocity and volume), the SKU routing engine may provide a distinct automated application for picking. In some implementations, the SKU routing engine may continually algorithmically evaluate the picking profile of each SKU and instruct the WES 102 and dispatch system 106 to transfer/relocate items to another storage location and/or picking area, swap item locations, etc., when necessary to maintain the most expedient flow in the facility. This advantageously reduces capital associated with fully automated high velocity items and reduces replenishment complexity.

The WES 102 may store productivity information for points in the order fulfillment facility in a database (e.g., a non-transitory data store 120). The productivity information may reflect mechanical capacity of that given point of the AGV system. In some cases, the mechanical capacity may be dynamic based on current conditions (e.g., system health, staffing levels (e.g., number of associates working in zone), stock levels, operational state, etc.).

In some implementations, the WMS 104 may algorithmically analyze the configuration of a cart AGV 116 depending on items that are set for distribution/fulfillment in the next picking time window. The WMS 104 may generate a stocking list for the cart based on hub, priority, pick density, pick zone demand, and item-to-item affinity, etc. In some instances, the REX 132 may use the stocking list when generating the schedule for the cart AGV 116.

The dispatch system 106 may be electronically communicatively coupled to a plurality of AGVs. In some implementations, the dispatch system 106, or elements thereof, may be integrated with or communicatively coupled with the REX 132. The dispatch system 106 includes hardware and software configured to dispatch the AGVs, and is coupled for communication the components of the system 100 to receive instructions and provide data between, for instance, the REX 132 and the AGVs 114 and 116. In some implementations, the dispatch system 106 may include AGV hardware drivers and controls, dispatch logic, AGV traffic management logic, and other hardware and software for communicating with and managing the AGVs.

The AGVs are robotic vehicles including drive units providing motive force for moving the AGVs (and, in some instances, carts, modular storage units 702, AGV racks, AGV shelves, etc.), guidance systems for determining position of the AGVs within the order fulfillment facility, and equipment for carrying items. The equipment for carrying items may include carton holders, AGV shelves, modular storage unit holders, etc., such as carts, shelves, etc., as described in further detail in reference to FIGS. 5A-8, for example. FIGS. 5A-8 depict various types of AGVs, such as a picking AGV 114 (also referred to as a modular storage fetching (MSF) AGV) and cart AGVs 116.

Figure 3A:
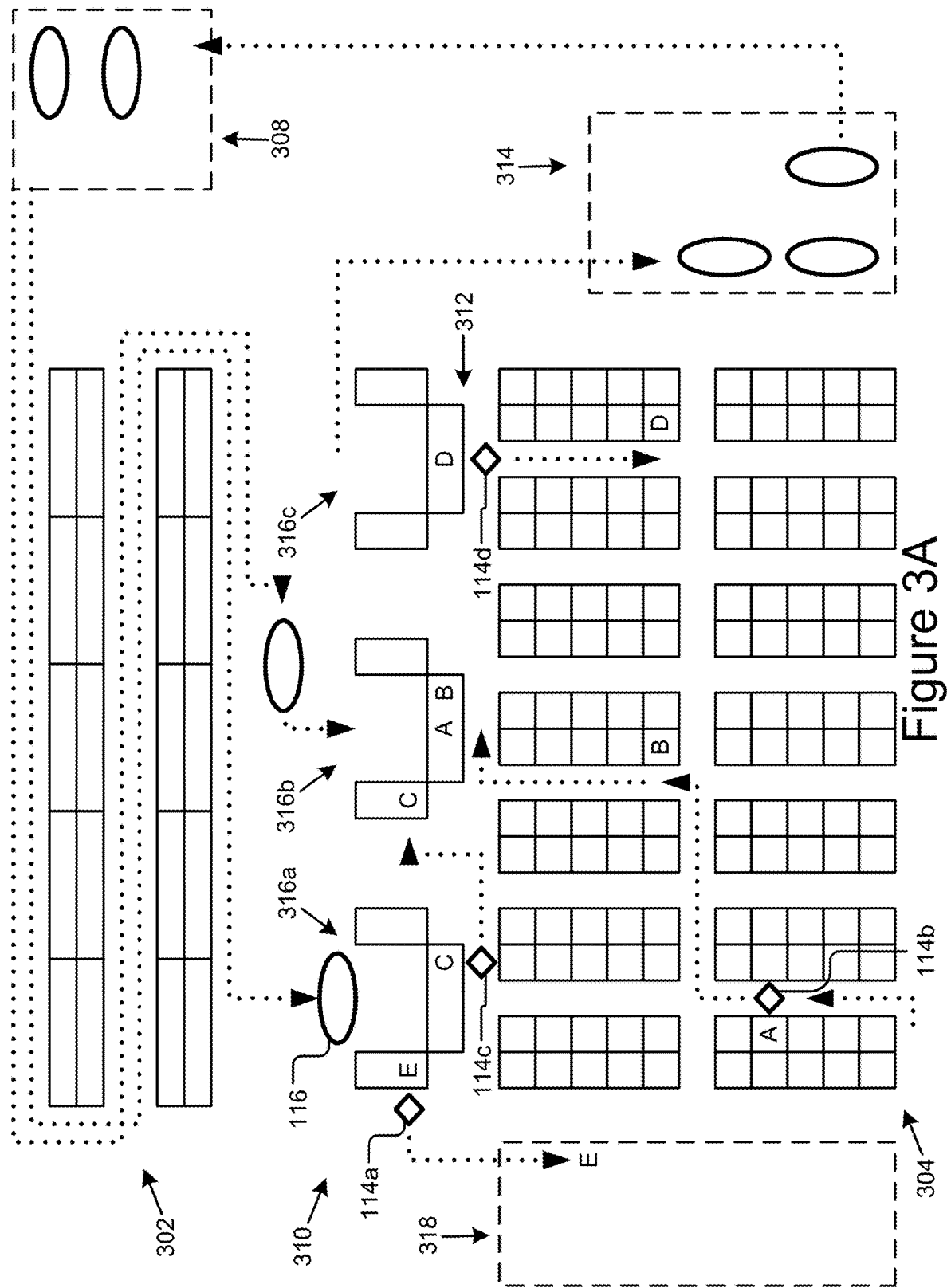
FIG. 3A is a schematic of an example configuration of an order fulfillment facility layout in a hybrid modular storage fetching system.

A cart AGV 116 is an automated guided vehicle or robot configured to autonomously transport pick-to-cart items from a pick-to-cart area 302 of the order fulfillment facility to a pick-cell station 316 and/or finalizing area 314 (e.g., as described in reference to FIG. 3A). The cart AGV 116 may include a drive unit adapted to provide motive force to the cart AGV 116 and a guidance system adapted to locate the cart AGV 116 in the order fulfillment facility. In some implementations, the cart AGV 116 is adapted to autonomously transport a carton holder (e.g., a cart or shelves) that is, in turn, adapted to hold cartons. Cartons may include, for instance, a box (e.g., a shipping box) adapted to hold items. For example, a cart AGV 116 may push/pull a cart (e.g., a carton holder) holding cartons around a pick-to-cart area 302 and may automatically stop at storage bays of the pick-to-cart area 302 where items to be picked are stored, so that a picker in the pick-to-cart area 302 can easily place items into one or more of the cartons. In some instances, the cart AGV 116 may transport the cart to a pick-cell station 316 to receive additional items into the cartons from high-density storage (e.g., from modular storage units 702 in high-density storage, as described below). In some instances, the cart AGV 116 may move at walking speed next to, behind, or in front of a picker walking through the pick-to-cart area 302 of the order fulfillment facility. Additional details of example cart AGVs 116 are shown and described in reference to FIGS. 5A-5D.

Figure 8:
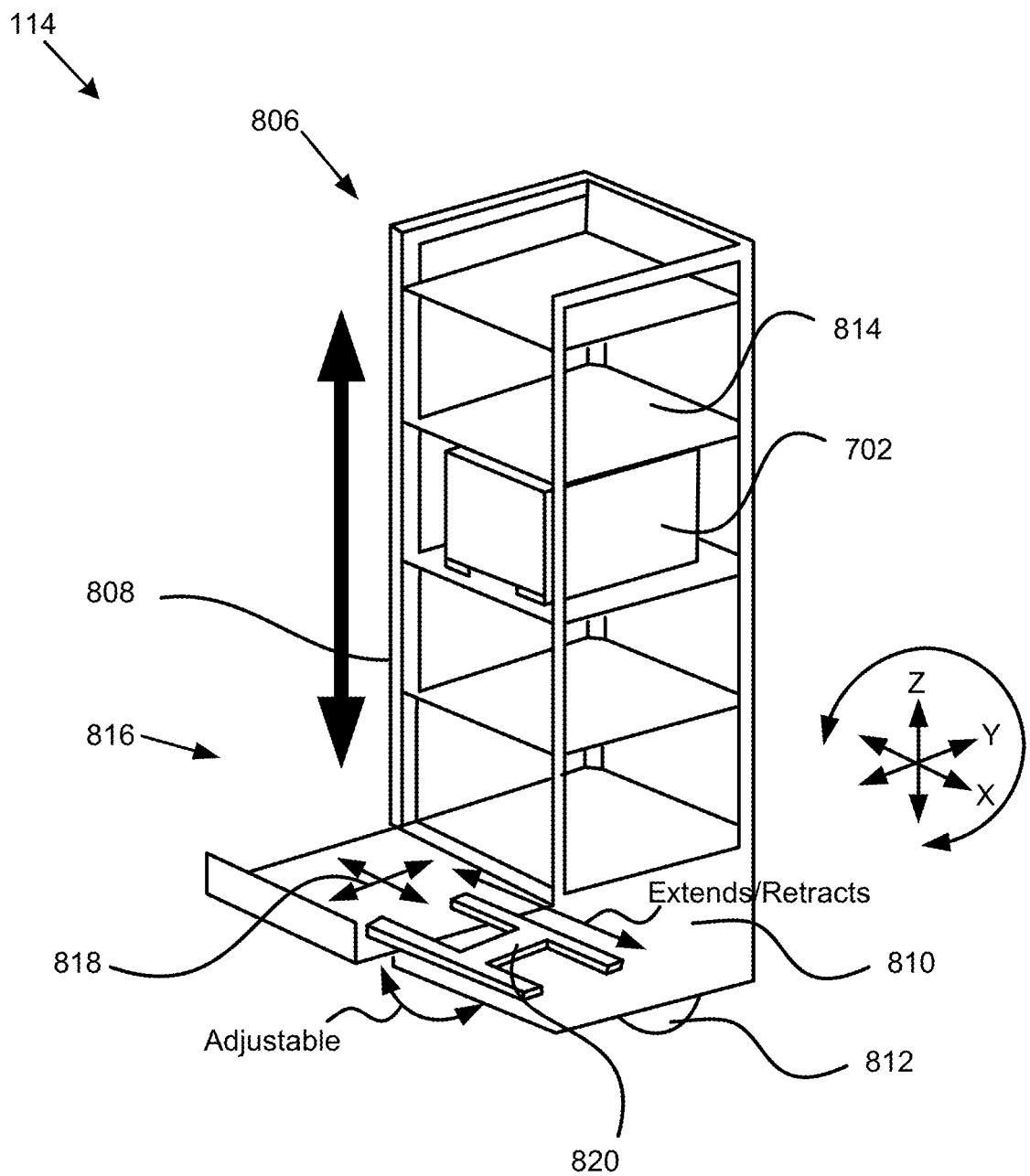
FIG. 8 is an illustration of an example picking automated guided vehicle.

A picking AGV 114a . . . 114n is an automated guided vehicle or robot that may be configured to autonomously transport items from a high-density storage area 304 of the order fulfillment facility to a pick-cell station 316, replenishment area 318, and/or finalizing area 314. The picking AGV 114 may include a drive unit adapted to provide motive force to the picking AGV 114, a guidance system adapted to locate the picking AGV 114 in the order fulfillment facility, and a shelving unit, which may be adapted to hold modular storage units 702. The picking AGV 114 may include a container handling mechanism (CHM) 816 (e.g., as shown in FIG. 8) that retrieves items or modular storage units 702 from storage shelves (e.g., in the high-density storage area), places items on an item holder (e.g., an AGV shelf) coupled with the picking AGV, and replaces items on storage shelves or at a pick-cell station. In some implementations, a picking AGV 114 may autonomously retrieve modular storage unit(s) 702 containing items to be picked in an order from the high-density storage area. For instance, the picking AGV 114 may transport the modular storage unit(s) 702 to a pick-cell station 316, so that a picker at the pick-cell station 316 can pick items from the modular storage unit(s) 702 and place them into containers in a cart. For example, a cart AGV 116 may transport a container to a bay in the pick-to-cart area 302 having a first item in an order, then to a pick-cell station 316 where a separate picking AGV 114 has delivered or will deliver a second item (e.g., in a modular storage unit 702) in the order, so that a picker can place the second item into the carton with the first item. The system 100 may coordinate the timing, placement, and movement of the cartons, modular storage units 702, pick-cell station 316 workload, and AGVs to bring cartons and modular storage units 702 having items corresponding to an order to the same pick-cell station 316 during the same time window, as described in further detail herein. Additional details of example picking AGVs 114 are described in reference to FIG. 8.

The WMS 104 may, in some implementations, include one or more hardware and/or virtual servers or software routines storable in one or more non-transitory memory devices and executable by one or more processors to perform the operations, acts, and/or functionality described herein. The WMS 104 may be configured to store and maintain carton data 124 in the data store 120. The carton data 124 includes information about cartons and/or containers in the system, such as a unique identifier for each carton or container, a carton or container type, the zones a carton will visit, the number of pick lines a carton proceeds through, and the priority for the carton. Some cartons may have a higher priority relative to other cartons and the system 100 may expedite handling of those cartons with higher priority relative to other cartons by the system 100. The carton data 124 may include a picklist defining the items the carton will contain. The WMS 104 may store data mapping items to the different pick zones (e.g., the pick-to-cart area 302, the high-density storage area 304, a particular modular storage unit 702, a particular location at a particular pick-cell station 316, etc.). In some implementations, the WMS 104 may be configured to communicate the carton data 124 with the WES 102, the picking system 108, and/or dispatch system 106 in real time, in batches, as requested by these components, etc.

The picking system 108 may, in some implementations, include one or more hardware and/or virtual servers or software routines storable in one or more non-transitory memory devices and executable by one or more processors to perform the operations, acts, and/or functionality described herein. The picking system 108 may receive pick confirmations, for example, from pickers or operators (e.g., using barcode scanners, NFC, RFID chips, or other sensors or input methods) working within a pick zone (e.g., a pick-to-cart area 302, pick-cell station 316, etc.) confirming that picks for a given carton have been performed, as described in further detail below.

The picking system 108 may include on or more computing devices having output devices, such as pick-to-voice or a pick-to-light system, graphical user interfaces, etc., for providing instructions and other information to pickers. The picking system 108 may be configured to communicate the pick confirmation data with the WES 102, WMS 104, REX 132, or other components of the system in real time, in batches, as requested by the components of the system, etc.

The picking system 108 may receive confirmatory input (e.g., pick confirmations) from pickers working within a pick zone. The confirmatory input confirms that all picks for a given carton have been completed. The picking system 108 transmits the confirmatory input to the WES 102 and/or the other components of the system 100. The confirmatory input may include the time stamp reflecting completion of the picks in the zone, a unique identifier identifying the picker (operator), a unique identifier identifying the pick zone, a unique identifier identifying the AGV, and/or a unique identifier identifying the carton (e.g. a carton number).

The data store 120 is an information source for storing and providing access to data. The data stored by the data store 120 may be organized and queried using various criteria including any type of data stored by it. The data store 120 may include data tables, databases, or other organized collections of data. An example of the types of data stored by the data store 120 may include, but is not limited to map data 122, AGV data 128, carton data 124, order data 126, modular storage unit data, etc. In some instances, the data store 120 may also include, conveying system attributes, picking data, picker attributes, sensor data, etc.

The data store 120 may be included in the WES 102, WMS 104, REX 132, or in another computing system and/or storage system distinct from but coupled to or accessible by the WES 102, WMS 104, REX 132, or other components of the system 100. The WES 102, picking system 108, REX 132, and/or dispatch system 106, for example, may store and maintain map data 122, order data 126, carton data 124, and AGV data 128. The data store 120 can include one or more non-transitory computer-readable mediums for storing the data. In some implementations, the data store 120 may store data associated with a database management system (DBMS) operable on a computing system. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The map data 122 may include data reflecting the 2 or 3 dimensional layout of the facility including the location of modular storage units 702, picking areas, lanes, equipment 110, storage shelving units, items, AGVs, etc. Map data 122 may indicate the attributes of the order fulfillment facility, including attributes of zones (e.g., one or more pick-to-cart areas 302, high-density storage areas 304, induction areas 308, finalizing areas 314, pick-cell stations 316, replenish stations, etc.). For example, attributes of zones may include the number, quantity, and location of shelving units or bays, modular storage units 702, items, guidance system locators or markers, etc.

The order data 126 includes data about picking including orders, items picked, items to be picked, picking performance, picker identities, pick confirmations, locations items are picked from, etc. Order data 126 may indicate the quantity and identity of items in orders, shipping addresses, order priority, progress of order fulfillment, number of cartons in an order, etc.

Item data 130 may describe items available for picking in an order fulfillment facility. The item data 130 may include unique identifiers for these items, the item volume (e.g., the total amount picked in given window (e.g., in an hour, day, etc.)), the item velocity (e.g., number of different times item picked in given window (e.g., per hour, day etc.), the unique location of the items within the order fulfillment facility (aisle, shelf, shelf position, etc.), other attributes of the item (e.g., size, description, weight, quantity of items in a package, color, etc.), item inventory, mapping of items of modular storage units 702, etc. In some implementations, the item data 130 may include the quantity of particular items a modular storage unit 702 contains, the current location of a modular storage unit 702, a preferred storage location of items and/or modular storage units 702, a threshold inventory level of items to be satisfied before autonomously transporting the modular storage unit 702 to a replenishment area 318 by a picking AGV 114 (e.g., to restock the items in the modular storage unit 702).

The AGV data 128 may describe the state of an AGV (operational state, health, location, battery life, storage capacity, items being carried, cartons, etc.), whether picker assigned to it, etc.

The components of the system 100 may be coupled to exchange data via wireless and/or wired data connections. The connections may be made via direct data connections and/or a computer network. The computer network may comprise any number of networks and/or types of networks, such as wide area networks, local area networks, virtual private networks, cellular networks, close or micro proximity networks (e.g., Bluetooth, NFC, etc.), etc. In some implementations, one or more of these components may be coupled via a data communications bus.

It should be noted that although certain features and operations are described in reference to particular components of the system 100, these features and operations may be performed by different components of the system 100 or additional components without departing from the scope of this disclosure.

Figure 2A:
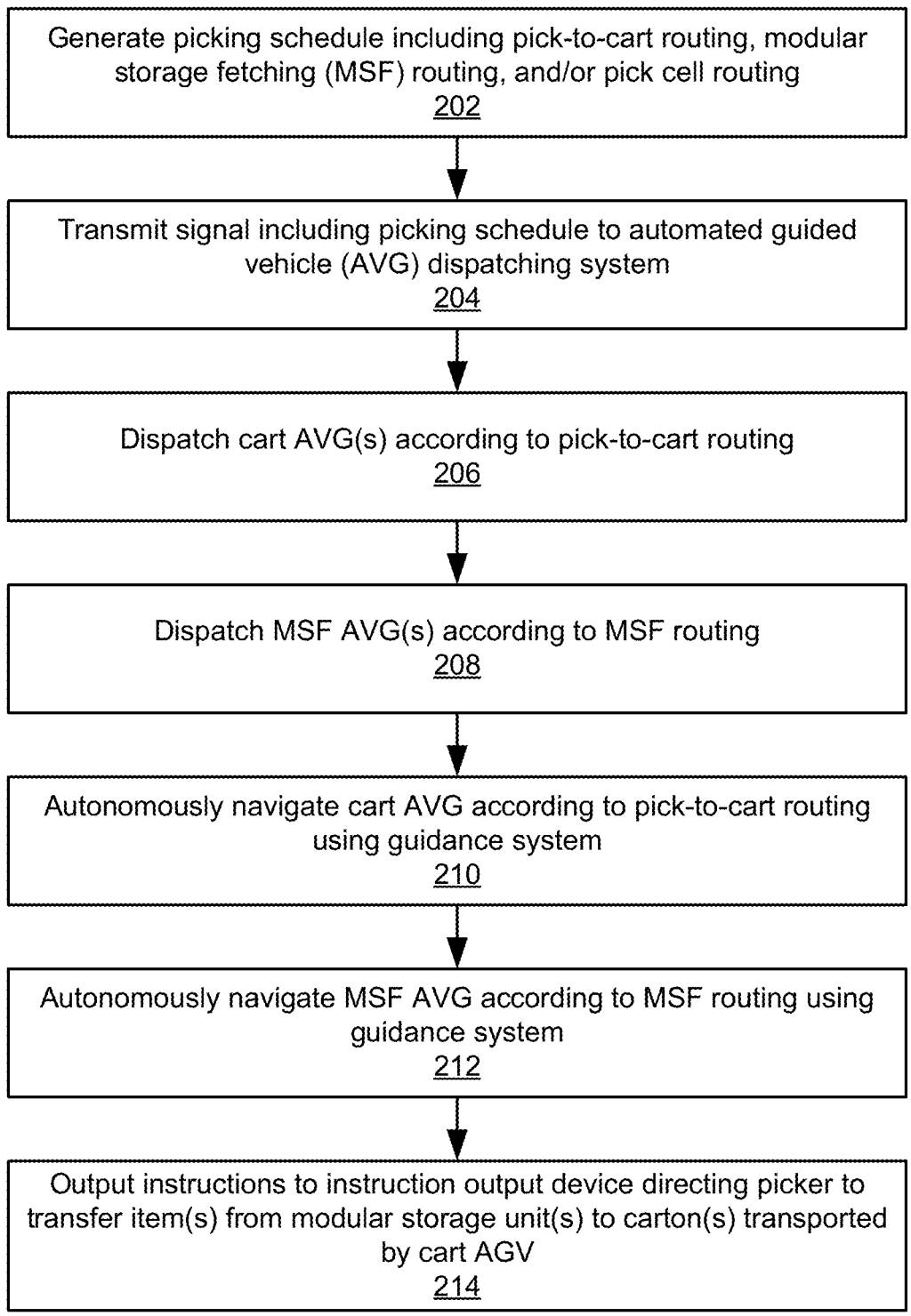
FIG. 2A is a flowchart of an example method for picking an order in a hybrid modular storage fetching system.

FIG. 2A is a flowchart of an example method for picking an order in a hybrid modular storage fetching system. At 202, the REX 132, or another component of the system 100, may generate a picking schedule including pick-to-cart routing, modular storage fetching (MSF) routing, and/or pick-cell routing based on order data 126. The order data 126 may include one or more first unique identification codes representing one or more first items located in a pick-to-cart area 302 of an order fulfillment facility. In some instances, the order data 126 may also include one or more second unique identification codes representing one or more second items located in a high-density storage area 304 of the order fulfillment facility.

The pick-to-cart routing describes routing of a particular cart AGV 116*a* . . . 116*n* through a pick-to-cart area 302. For example, the pick-to-cart routing may include a list of pick-to-cart items to be picked to the cartons transported by the cart AGV 116. The pick-to-cart routing may indicate the location of the storage units, shelves, or bays in which an item in the picking list is located. In some implementations, the pick-to-cart routing may also include a defined route of a cart AGV 116 through these locations and an indication of locations at which to stop the cart AGV 116, so that a picker can pick items from adjacent storage units, shelves, or bays into the cartons transported by the cart AGV 116. The pick-to-cart routing may also include a schedule indicating when to pick items and when to deliver cartons to a particular pick-cell station 316.

The MSF routing describes routing of a particular picking AGV 114 through a high-density storage area 304. For example, the MSF routing may include a picking list of items stored in modular storage units 702, unique identification codes of the modular storage units 702, and the current locations of the modular storage units 702. In some instances, the current location of the modular storage units 702 may be in the high-density storage area 304, in a replenishment area 318, or at a pick-cell station 316. The MSF routing may also include a defined route of a picking AGV 114 through the order fulfillment facility to retrieve one or more modular storage units 702 including items from one or more orders and deliver those modular storage units 702 to assigned pick-cell stations 316. The defined route may be calculated to most efficiently retrieve one or a series of modular storage units 702, maximize a quantity of modular storage units 702 for the picking AGV 114 to retrieve in a single trip, to avoid traffic of other AGVs, and/or to cause the modular storage unit(s) 702 to arrive at a pick-cell station 316 at a minimized time difference from a carton (e.g., transported by a separate cart AGV 116) arriving at the same pick-cell station 316 to which the item in the modular storage unit 702 is to be placed, for example. The MSF routing may also include a schedule indicating when to retrieve modular storage units 702 and when to deliver the modular storage units 702 to a particular pick-cell station 316.

Pick-cell routing may describe routing of AGVs among pick-cell stations 316. For instance, a modular storage unit 702 may be transferred by a picking AGV 114 from one pick-cell station 316 to another pick-cell station 316, as described elsewhere herein.

In some implementations, the REX 132, or another component of the system 100, may determine, based on load information in one or more of the pick zones, that a particular zone, picker, path, pick-cell station 316, etc., has a high traffic load. In response to such a determination, the REX 132 may dynamically adjust the routing schedule, for example, dictating which cart AGVs 116 or picking AGVs 114 are sent into different zones of the order fulfillment facility. For example, the REX 132 may determine that there is a threshold level of traffic (e.g., by cart AGVs 116) in the pick-to-cart area 302, in response to which determination, the REX 132 may induct AGVs (e.g., cart AGVs 116 with particular orders to be filled) into the hybrid modular storage fetching system that bypass the pick-to-cart area 302 and proceed directly to pick-cell stations 316 to receive items from modular storage units 702. In another example implementation, the REX 132 may determine, for instance, that there is a threshold level of traffic in a staging area 312 or that no picking AGVs 114 are available to retrieve items from high-density storage area 304 and may, in response, induct cart AGVs into the system that do not stop at a pick-cell station 316 or that require fewer modular storage units 702 to be retrieved from high-density storage. Accordingly, in some implementations, the REX 132 my dynamically balance the load of various zones, AGVs, pick-cell stations, etc., in the system by adapting the composition (e.g., items from pick-to-cart versus from high-density storage) of orders/cartons on a particular AGV (e.g., a cart AGV), for example.

At 204, the REX 132 may transmit a signal including the picking schedule (or components thereof) to the dispatch system 106.

At 206, the dispatch system 106 may dispatch a cart AGV 116 according to the picking schedule. In some implementations, dispatching a cart AGV 116 may include creating cartons, assigning the cartons to a cart to be transported by a cart AGV 116, placing the cartons on the cart, and, in some instances, coupling the cart AGV 116 with the cart. For instance, the REX 132 or WMS 104 may assign orders (or items thereof) to cartons. Labels with unique identification codes identifying the cartons may be printed, placed on cartons, and the cartons may be placed on the cart at an induction area 308. The unique identification codes of the cartons may match, in the data store 120, the carton (and therefor the cart/cart AGV 116) with items to be picked.

At 208, the dispatch system 106 may dispatch a picking AGV 114 according to the MSF routing.

At 210, the cart AGV 116 may autonomously navigate along a path through the pick-to-cart area 302 according to the pick-to-cart routing to retrieve one or more items located in the pick-to-cart area 302. As described elsewhere herein, the cart AGV 116 may follow the guidance system through the pick-to-cart area 302 and stop at designated areas for items stored in those areas to be picked to the designated cartons. In some implementations, the cart, carton, cart AGV 116, storage area, or separate computing device (e.g., a mobile device of a picker) may include an output device that provides output indicating items to be picked at a particular location and, in some implementations, the output device may also include an input to receive pick confirmations. Once the pick confirmation has been received, the cart AGV 116 may autonomously move to the next area to pick a subsequent item assigned to a carton on the cart.

Once items in the pick-to-cart storage area have been picked to the cart AGV 116, the cart AGV 116 may autonomously navigate to an assigned pick-cell station 316 or to a finalizing area 314 according to the pick-to-cart routing. In some implementations, the cart AGV 116 may decouple from the cart and leave the cart at the pick-cell station 316 (or at a finalizing area 314) so that the cart AGV 116 may transport another cart while the first cart is being filled with items from modular storage units 702, for example.

At 212, the picking AGV 114 may autonomously navigate to a location of the one or more modular storage units 702 in the high-density storage area 304 (or a replenishment area 318, pick-cell station 316, etc.), the one or more modular storage units 702 containing one or more items in an order, for example, an order with a carton transported by a cart AGV 116, as described above. The picking AGV 114 may autonomously retrieve the one or more modular storage units 702 from the high-density storage area 304, for example. The picking AGV 114 may then autonomously navigate from the location of the modular storage unit(s) 702 to the pick-cell station 316 according to the MSF routing to transport the modular storage unit(s) 702 to the pick-cell station 316. In some implementations, the picking AGV 114 may hold a plurality of modular storage units 702 and may deliver each of the modular storage units 702 to the same pick-cell station 316 or to separate pick-cell stations 316. In some implementations, the picking AGV 114 may also retrieve modular storage units 702 that are no longer needed at a particular pick-cell station 316 either separately or while delivering new modular storage units 702 to the pick-cell station.

At 214, the picking system 108 outputs instructions to an output device (e.g., on the cart, pick-cell station, modular storage unit 702, or separate computing device, etc.), the instructions directing a picker at a pick-cell station to transfer items from modular storage unit(s) 702 at the pick-cell station to carton(s) on the cart.

Figure 2B:
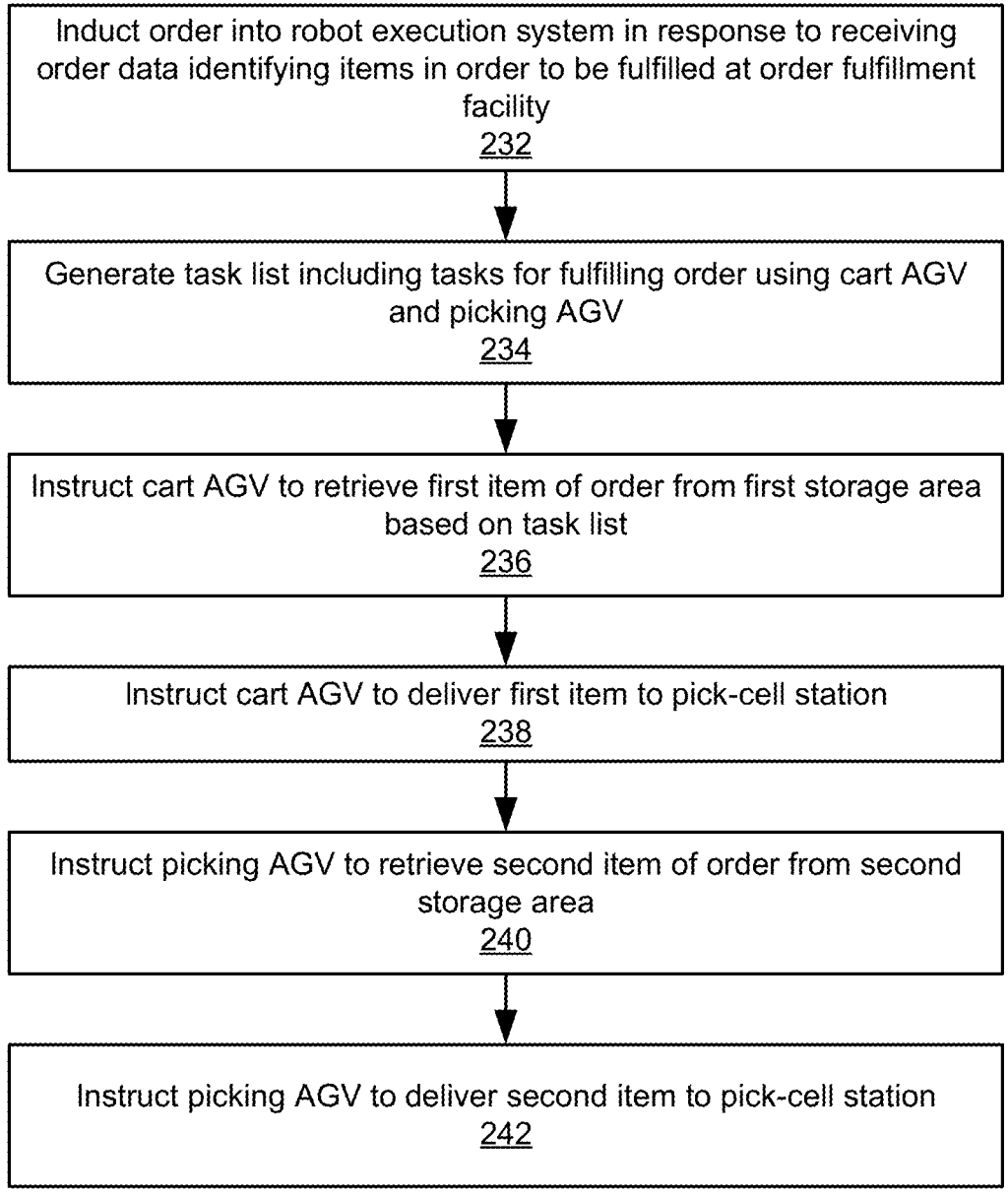
FIG. 2B is a flowchart of an example method of managing automated guided vehicles by a robot execution system in a hybrid modular storage fetching system.
Figure 4A:
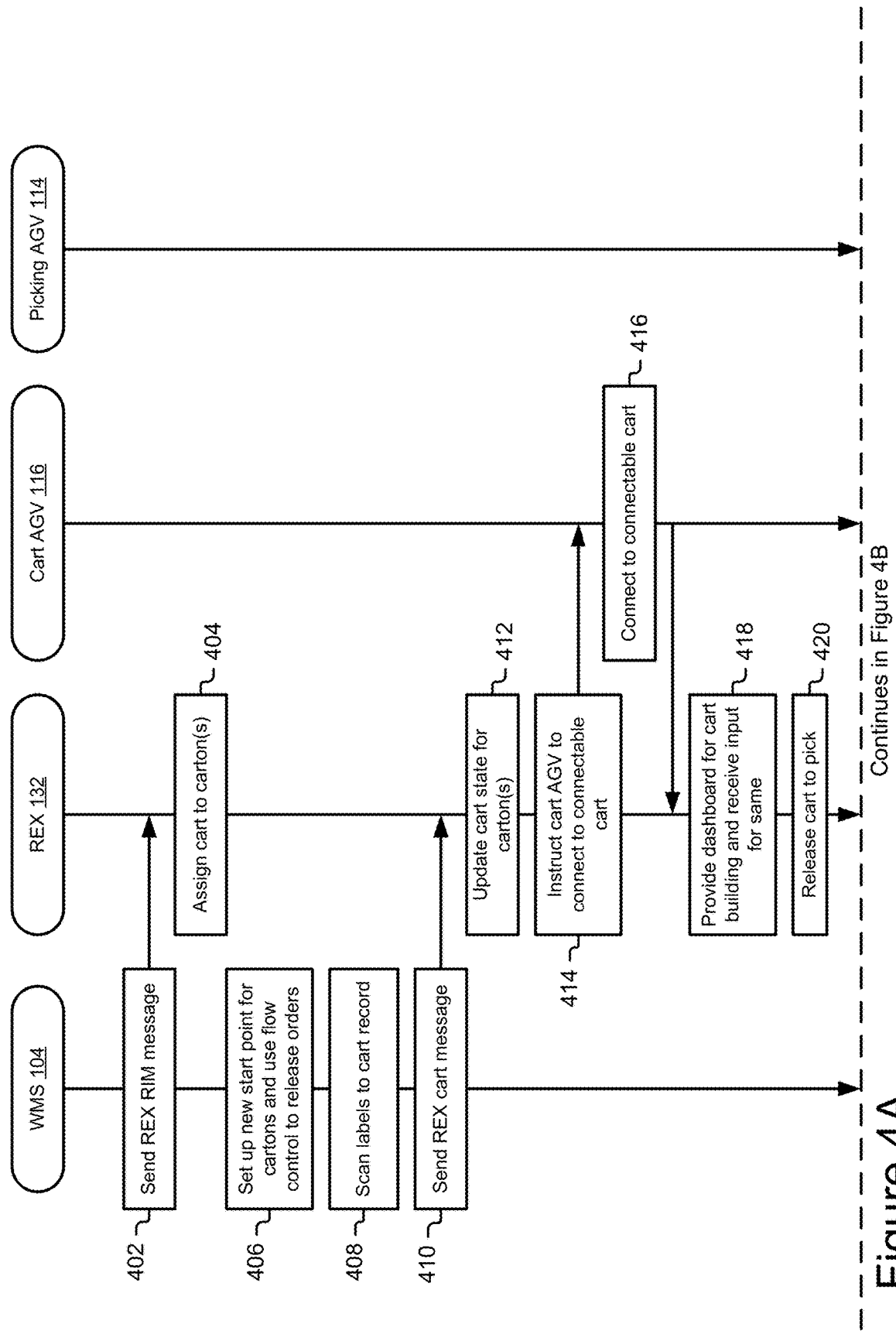
FIGS. 4A-4E are data-flow diagrams of an example method of managing automated guided vehicles by a robot execution system.
Figure 4B:
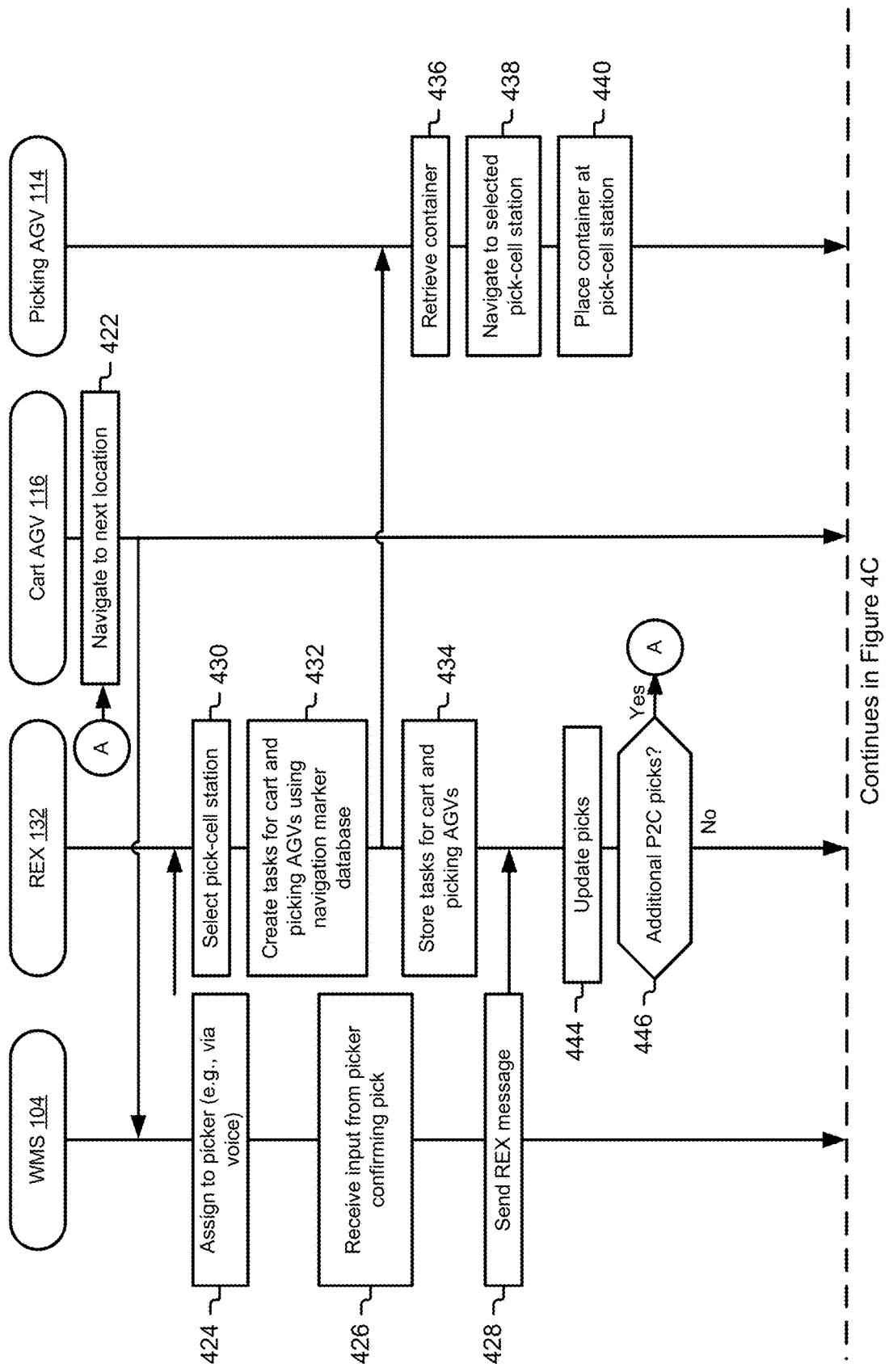
Figure 4C:
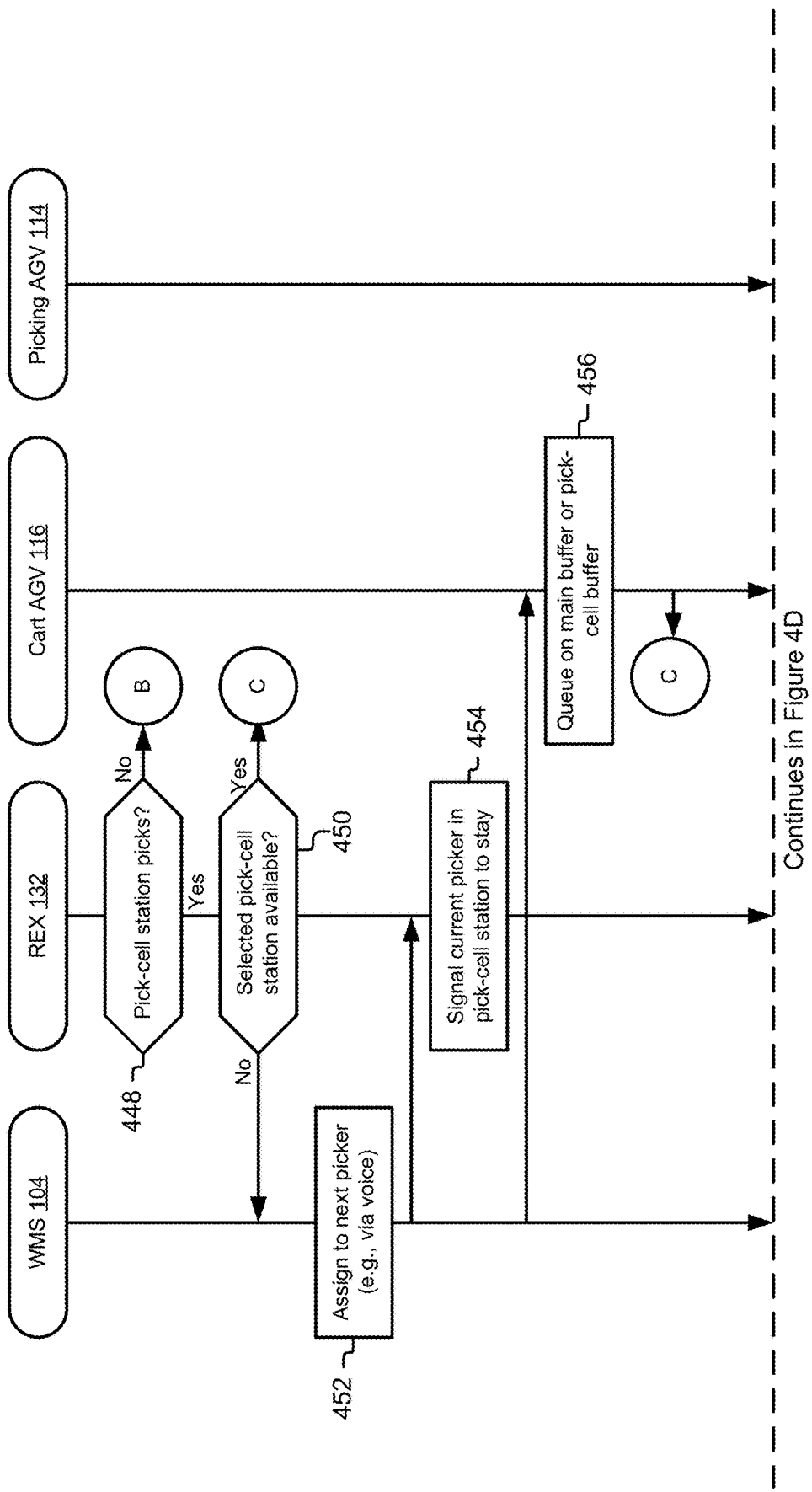
Figure 4D:
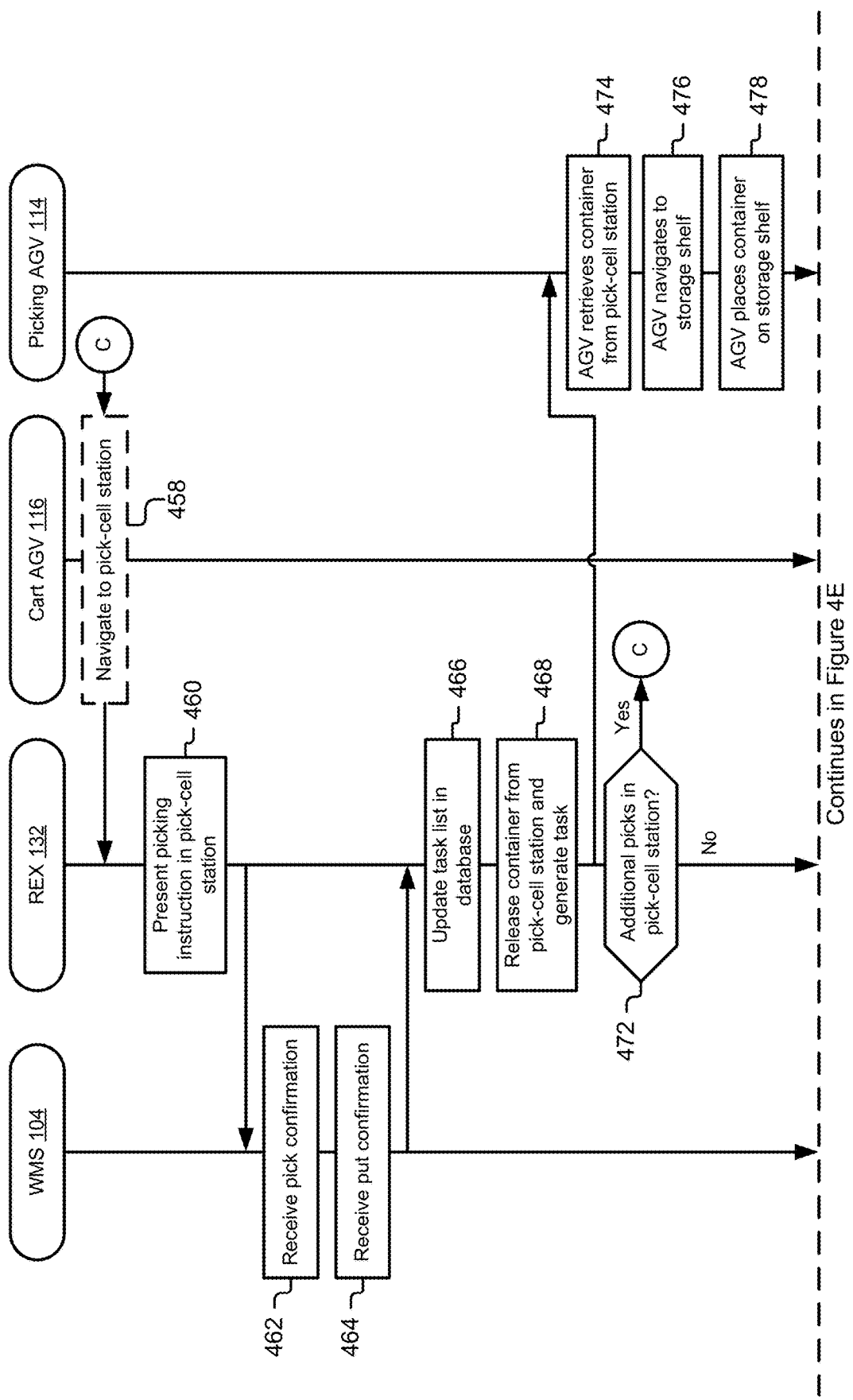
Figure 4E:
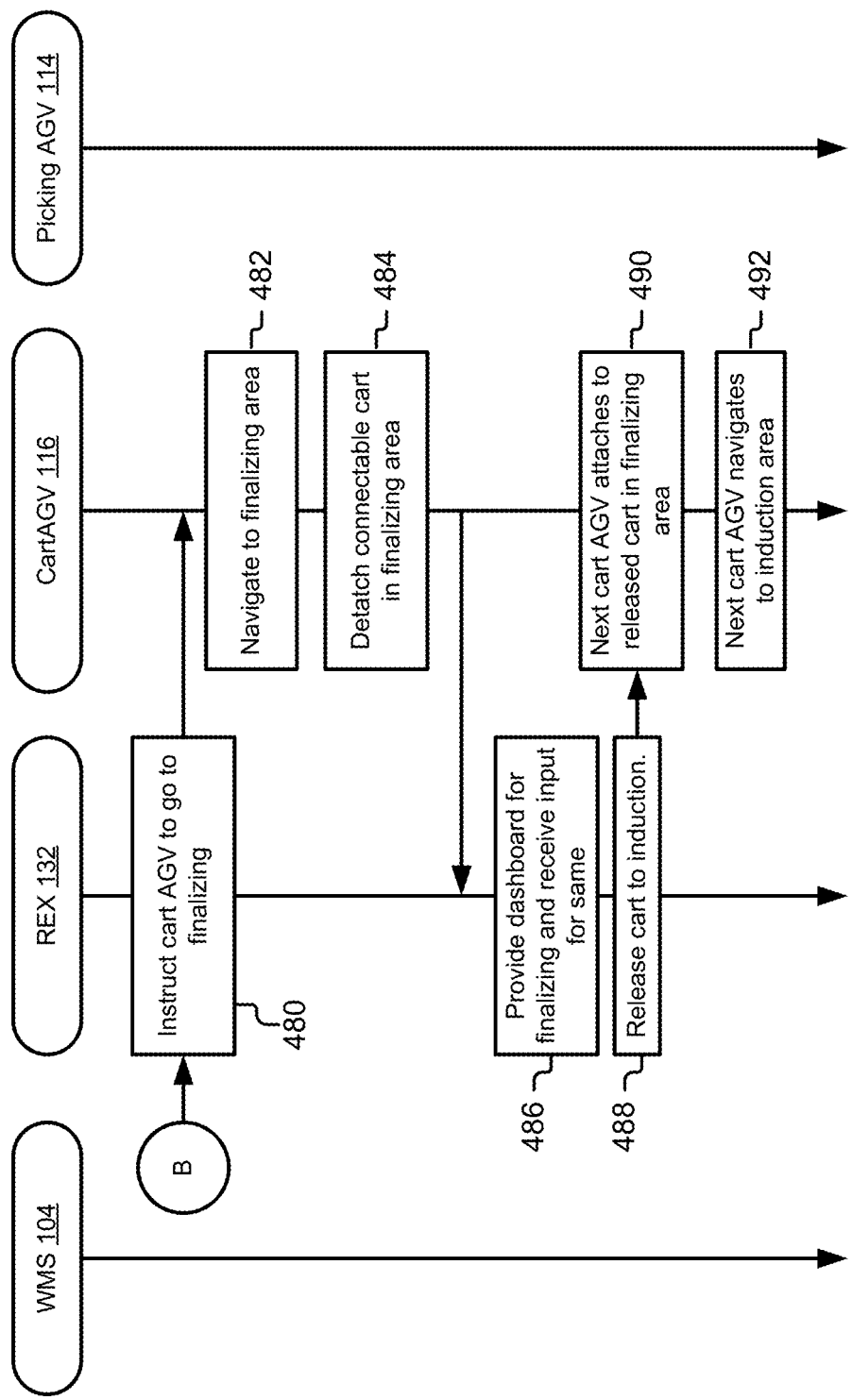

FIG. 2B is a flowchart of an example method of managing AGVs by a REX 132 in a hybrid modular storage fetching system. At 232, the REX 132 may induct an order into the system, for instance, in response to receiving order data identifying items in the order to be fulfilled at an order fulfillment facility. For example, the REX 132 may receive an induction instruction message from the WMS 104 including the order data and labels that describe cartons, items to be picked to using the cart AGV 116, items to be picked using a picking AGV 114, orders assigned to the cart AGV 116, a connectable cart, and/or cartons carried by the cart AGV 116. The REX 132 may store the labels in association with the cart AGV 116 and/or a connectable cart coupleable to the cart AGV 116 in the data store 120. The induction of the order is described in further reference with at least FIG. 4A herein.

The order fulfillment facility may include an operating environment with a first storage area (e.g., a pick-to-cart area 302) storing a first set of items, a second storage area (e.g., a high-density storage area 304) storing a second set of items, and a pick-cell station 316 at which one or more selected items from one or more of the first storage area and the second storage area are placed into a carton.

At 234, the REX 132 may generate a task list including tasks for fulfilling the order using one or more cart AGVs 116 and/or picking AGVs 114. The task list may include a picking schedule, as described above. For instance, in some implementations, the REX 132 may generate or update a task list to indicate a sequence of locations (e.g., where items in the order are located) for a cart AGV 116 and/or a picking AGV 114 to navigate to and, in some instances, retrieve modular storage units 702 or other items from.

At 236, the REX 132 may instruct a particular cart AGV 116 to retrieve a first item of the order from the first storage area based on the task list, the first item being in the first set of items. For example, the REX 132, or another component of the system 100, may determine that a particular item is in a set of items stored in a pick-to-cart area 302 of the order fulfillment facility, determine the location of the item, and instruct a next available cart AGV 116 to navigate to and retrieve the item from the determined location in the pick-to-cart area 302 (e.g., either automatically, or by issuing an instruction to a picker to pick the item to a carton held by the cart AGV 116).

At 238, the REX 132 may instruct the cart AGV 116 to deliver the first item to the pick-cell station 316. For example, the REX 132 may instruct the cart AGV 116 to navigate (e.g., using a guidance system) to and stop at a pick-cell station 316.

At 240, the REX 132 may instruct the picking AGV 114 to retrieve a second item of the order from the second storage area, the second item being in the second set of items. For example, the REX 132, or another component of the system 100, may determine that a particular item (e.g., in a modular storage unit 702) is in a set of items stored in a high-density storage area 304 of the order fulfillment facility, determine the location of the particular item, and instruct a next available picking AGV 114 to navigate to and retrieve the item from the determined location in the high-density storage area 304.

For example, the picking AGV 114 may navigate (e.g., using a guidance system) to a location in front of a storage shelving unit in the high-density storage area 304 at which a modular storage unit 702 having the item is stored. The picking AGV 114 may then extend a carrying surface 820 underneath the modular storage unit 702, lift the modular storage unit 702 from the storage shelving unit, and retract the carrying surface 820 with the modular storage unit 702 to the picking AGV 114. In some instances, the picking AGV 114 may place the modular storage unit 702 on an AGV rack 806 during navigation of the picking AGV 114 through the operating environment.

At 242, the REX 132 may instruct the picking AGV 114 to deliver the second item to the pick-cell station 316. For instance, the picking AGV 114 may navigate to a location of the pick-cell station 316, and place the second item (e.g., a modular storage unit 702 containing the second item) on a shelf of the pick-cell station 316. For example, the picking AGV 114 may lift the modular storage unit 702 from an AGV rack 806 by a carrying surface 820, extend the carrying surface 820 to the pick-cell station shelf, lower the modular storage unit 702 onto the pick-cell station shelf, and retract the carrying surface 820.

FIG. 3A depicts a schematic of an example configuration of an order fulfillment facility, which may be an operating environment of one or more picking AGVs 114 and cart AGVs 116. It should be understood that various distribution facilities may include different picking zones having different stocking infrastructure and picking configurations. For instance, high-volume and/or velocity items (e.g., items appearing above a defined threshold of frequency in orders) may be stored in a pick-to-cart area 302 and be available for immediate picking, and relatively moderate and/or low-volume and/or velocity items may be stored in high-density storage area 304 on modular storage units 702 which may be retrieved by picking AGVs 114 for an upcoming pick.

The layout depicted in FIG. 3A includes various areas: an induction area 308, a pick-to-cart area 302, a pick-cell area 310, a pick-cell staging area 312, a high-density storage area 304, a finalizing area 314, and a freight or modular storage unit elevator (not shown) for multi-level access when the layout includes multiple floors. In some cases, the layout may include multiple levels of mezzanine with one or more of the different zones/areas. In some implementation, cart AGVs 116 are staged in the induction area 308 and are set up for picking sessions. In some implementations, cartons are assembled, labeled with unique scannable visual identifiers to associate them with specific orders, and are placed on the supports (e.g., cart shelves) of the cart AGVs 116 in the induction area 308.

The pick-to-cart area 302 is configured for high-velocity and/or volume items and advantageously reduces capital associated to handle this type of item class. Inventory may be stored in high-volume storage in containers or pallets, for example. High velocity items may be divided into pick zones, each zone may include a plurality of bays (e.g., 4, 5, 6+), which may be balanced by the SKU routing engine based on demand by the SKU routing engine. Cart AGVs 116 may be scheduled by the REX 132 to autonomously visit these zones, and pickers accompanying the cart AGVs 116 may be guided by the picking hardware (e.g., pick-to-voice and/or pick-to-light) controlled by the picking system 108. In an example, a cart AGV 116 is instructed by the REX 132 to stop directly in front of a bay location. The cart AGV 116 may self-locate using a guidance system. For example, the guidance system may include guidance system locators or markers, such as guide tape (magnetic, colored, etc.), laser target navigation, inertial navigation, vision guidance, geo-location, QR codes on the floor of the order fulfillment facility, RFID (radio frequency identification) tags, beacons, etc., that can be used to locate and navigate AGVs in the order fulfillment facility. Further, the AGVs may include guidance system components configured to read the guidance system locators, such as a QR code reader, wireless radio, etc.

After the picker picks the item and confirms the pick with the picking hardware, the cart AGV 116 autonomously moves to the next sequential bay until the picks are complete. As shown in FIG. 3A, a cart AGV 116 has the capability to bypass zones, bays, shelves, etc., without picks. Each zone can have dedicated cart AGV 116 accumulation or queue before the zone to reduce cycle time.

The picking station area may include pick-cell stations 316a, 316b, and 316c situated along primary path(s) via which the cart AGVs 116 are routed. In FIG. 3A, the pick-cell stations 316 are situated opposing a portion of the pick-to-cart area 302 and the cart AGVs 116 may be routed to visit one or more of these pick-cell stations 316 depending on the items that need to be picked and placed in the cartons of these cart AGVs 116. In the case that in given cart AGV 116 does not require any items from the picking station area, it may bypass it entirely and proceed to the finalizing area 314.

In some implementations, for a given picking session, the REX 132 may establish a single line picking configuration in which the picker and the cart travel through an inventory pick path along a single line until the picks are fulfilled. In further implementations, based on demand, a fast moving area may be established by the REX 132 that includes multiple routes: a higher speed line that includes single line picking for low-demand items and another area for high demand items. This combination can advantageously balance daily labor.

The layout may also include a replenishment area 318 in which modular storage units 702 are replenished with items. For instance, item inventory in a given modular storage unit 702 may be replenished by a picking AGV 114 that picks the modular storage unit 702 from static shelves and transports them to the replenishment area 318 where a case may be opened and items from the case placed directly into the modular storage units 702. One or more items (whether of the same type of item or different types) can be placed in a given modular storage unit 702. In some cases the modular storage unit 702 may be replenished while it is in the static shelf. Having multiple options (manual or AGV) for replenishment has more flexibility to adjust to resource allocation and schedule. Additionally or alternatively, the picking AGV 114 can swap out the modular storage unit 702 with another containing the same SKUs which has been prepared ahead of time and staged for that purpose.

In some implementations, the REX 132 may instruct picking AGVs 114 to replenish and distribute modular storage units 702 in different locations of the high-density storage area 304 based on order history. In these implementations, items with high order frequency orders may be distributed in more locations than items with lower order frequency. The WES 102 may maintain a moving minimum based on order quantity minimizing the need to use inventory from two locations to fulfill an order, and the REX 132 may schedule the AGVs accordingly.

The modular storage units 702 storing items may be moved by picking AGVs 114 from high-density storage area 304 into a staging area 312 and staged for movement into a pick-cell station for an upcoming pick. In some implementations, the storage units of faster-moving items may be moved directed to a pick cell 382 in a given pick-cell station 316.

In further implementations, the REX 132 may instruct a picking AGV 114 to transfer a modular storage unit 702 between cells of a pick-cell station 316, or between pick-cell stations 316 (e.g., 316a and 316b) without having to expend the time to return the modular storage unit 702 to the high-density storage area 304.

FIG. 3A also illustrates example paths of AGVs through the order fulfillment facility. The paths are represented by dotted lines, cart AGVs 116 are represented by ovals, and picking AGVs 114*a* . . . 114*d* are represented by diamonds.

Example cart AGV paths are illustrated in FIG. 3A, for example, a cart AGV 116 may navigate from an induction area 308, on a path through the pick-to-cart area 302, and then to one or more pick-cell stations 316. Once the picks for the cart AGV 116 have been completed, it may navigate to a finalizing area 314 where cartons are prepared for shipment, for example. Once the cartons have been removed from the cart AGV 116, the cart AGV 116 may return to the induction area 308 to start through the process again.

Example picking AGV paths are also illustrated in FIG. 3A, for example, a picking AGV 114*a* may transport a modular storage unit E from a first pick-cell station 316*a* to a replenishment area 318 for replenishment. A picking AGV 114*b* may retrieve a first modular storage unit A from a first location, navigate to a second location, retrieve a second modular storage unit B, and transport both the first and second modular storage units A and B to a pick-cell station 316*b*. A picking AGV 114*c* may retrieve a modular storage unit C from a first pick-cell station 316*a* and transport it to a second pick-cell station 316*b*. A picking AGV 114*d* may retrieve a modular storage unit D and transport it back to the high-density storage area 304. It should be understood that these paths and implementations are provided as examples and that other combinations are possible and contemplated herein. For example, one or more picking AGVs 114 may perform some or all of the paths illustrated as well as others not illustrated in FIG. 3A. Further, as described elsewhere herein, the automation of the picking AGV 114 may be performed in synchronization with other actions (e.g., automation of cart AGVs 116, picking sessions or windows, movement of other AGVs or pickers, etc.) in the hybrid modular storage fetching system.

Figure 3B:
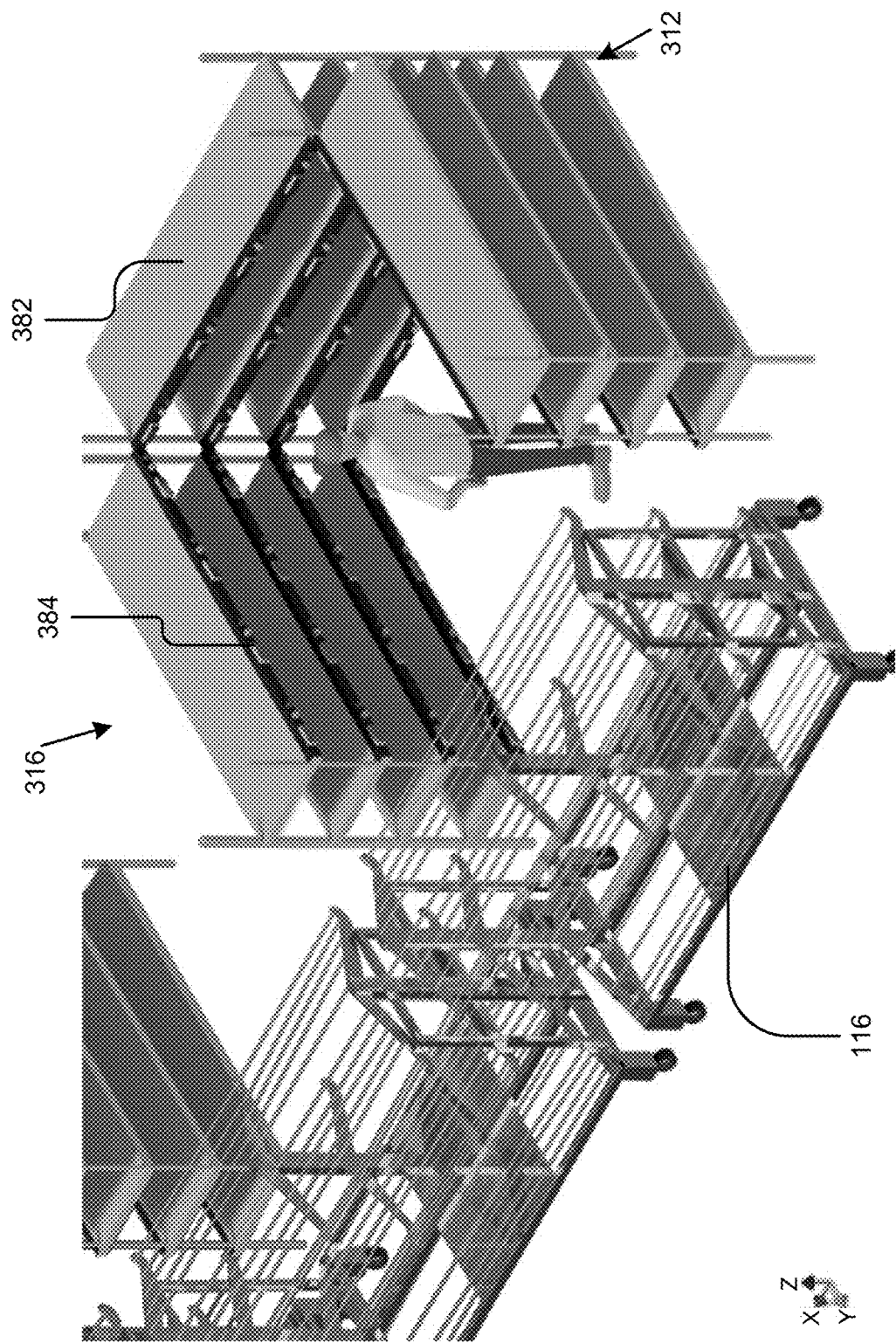
FIG. 3B is an illustration of an example pick-cell station.

FIG. 3B is an illustration of an example pick-cell station 316. Each pick-cell station 316 may include one or more pick cells 382. The pick cells 382 are a temporary storage mediums (e.g., shelves, bays, etc.) for the modular storage units 702 (e.g., mini pallets, totes, modular storage racks, etc.) and modular storage units 702 may be storage containers that can be picked up or tugged and transported by a picking AGV 114. In some cases the pick-cell station 316 may include an output device, such as a pick-to-light frame, for carts, that matches the locations of the cartons in the cart and/or a put or pick-to-light frame 384 for the pick cells 382 to indicate the locations of modular storage units 702 to use for a particular pick. For instance, a pick-cell station 316 may include an output device configured to provide picking instructions to a picker, the picking instructions indicating to the picker which of the items in the modular storage units 702 to place in a carton held on the carton holder of the cart AGV 116.

One or multiple of the pick cells 382 may be organized into a staging area 312 around a picker in a pick-cell station 316, so that modular storage units 702 can be easily accessed by the picker. In some implementations, a picking AGV 114 may be configured to stage the modular storage units 702 at the staging area 312. For instance, a picking AGV 114 may approach from the rear of a pick cell 382 and stage (e.g., place, deliver, etc.) a modular storage unit 702 on the pick cell 382. In some implementations, a modular storage unit 702 may be associated by the picking system 108 with a particular location in the staging area 312 to more precisely direct a picker to the location of the modular storage unit 702 (e.g., using a pick-to-light or other output system).

At a given pick-cell station 316, a cart AGV 116 may arrive and situate itself on one side of the station with the cartons on the cart AGV 116 facing the picker. On the other sides of the station are pick cells 382 in which modular storage units 702 situated and from which the picker may select items to fulfill the orders associated with the cartons. The modular storage units 702 may contain one or more items, types of items (e.g., represented by different universal product codes or stock keeping units), etc.

FIGS. 4A-4E are data-flow diagrams of an example method of managing AGVs by a REX 132. The WES 102 or WMS 104 may receive an order including items for distribution/fulfillment. The order may be reflected in order data 126 having a unique identification code (e.g., unique product codes, stock keeping units, etc.) for an item and a quantity associated with that item. The order may be assigned a carton (e.g., of a particular size, dimension, etc.) for picking and/or shipping or, in some instances, split into multiple cartons. At 402, the WMS 104 may send a robot information message (RIM) to the REX 132. The RIM message may indicate to the REX 132 that one or more cartons are being to be inducted into the system, for example, by identifying the cartons in one or multiple orders and, in some instances, items in the cartons. The RIM message may include order details, carton numbers, lines in an order, SKUs in an order, quantities of SKUs in an order, or other information for inducting an order into the system.

At 404, the REX 132 may assign a cart to the cartons and, in some instances, store the carton information received in the RIM message in the data store 120. In some implementations, the cart may include a connectable cart, which may be assigned to a cart AGV 116, for instance, based on an availability of the cart AGV 116, proximity of the cart AGV 116 to an induction area 308, availability or location of a connectable cart, size or other attributes of the connectable cart, or another criteria.

At 406, the WMS 104 may set up a new start point for cartons and use flow control to release orders. For instance, the WMS 104 may assign items to the carton(s) assigned to a cart AGV 116. For instance, the one or more orders assigned to the cart AGV 116 (e.g., to the connectable cart) may each be assigned to one or more cartons. In some implementations, releasing the orders may include printing labels with unique identifiers (e.g., QR codes, bar codes, stock keeping units, tracking codes, etc.) and/or creating the cartons and placing them on the cart of the cart AGV 116.

At 408, the WMS 104 may receive input scanning the labels to a cart record of the cart (e.g., using voice input or other input of the picking system 108). For instance, a picker in the induction area 308 may scan the labels using an optical scanner, which is coupled with the WMS 104. The WMS 104 may then associate, in a cart record, the unique identifier of the labels, the order(s), the items in the order(s), and the cart/cart AGV 116, for instance.

At 410, the WMS 104 may send a cart message to the REX 132. The cart message may indicate the labels assigned to the cart/cart AGV 116, thereby identifying the orders assigned to the cartons on the cart/cart AGV 116. In some instances, the message may identify one or both of the items in each order that are stored in the high-density storage area 304 and the pick-to-cart area 302.

In some implementations, the RIM message and the cart message may be sent as separate messages or may be combined into an induction instruction indicating one or more first items in each order assigned to the cart AGV 116 to be picked using the cart AGV 116 and one or more second items in each order to be picked using the picking AGV 114. It should be noted that some orders may include only items located in the pick-to-cart area 302 or items located in the high-density storage area 304 of an order fulfillment facility without departing from the scope of this disclosure.

At 412, the REX 132 may update the cart state and/or carton information for the carton(s), for instance, to indicate that the labels have been assigned to the cart/cart AGV 116, and, in some implementations, may instruct a cart AGV 116 to connect to a connectable cart.

At 416, in response to receiving the instruction from the REX 132, the cart AGV 116 may navigate to a location of the cart (e.g., in the induction area 308) and mechanically couple with the cart, so that the cart AGV 116 may push or pull the cart through the order fulfillment facility. For example, a cart AGV 116 may include a coupling mechanism that detachably couples the cart AGV 116 to a connectable cart. The coupling mechanism may mate with a corresponding coupling component of the connectable cart, so that when the cart AGV 116 is under or adjacent to the connectable cart, the coupling mechanism may attach the connectable cart, for instance, in response to a signal received from the dispatch system 106. The cart AGV 116 may then pull or push the connectable cart through an operating environment, such as the order fulfillment facility described in reference to FIG. 3A.

At 418, the REX 132 may provide a dashboard for cart building and receiving input for the same. For instance, the REX 132 may output a dashboard embodied by a graphical user interface presented on a computing device, which may be part of the picking system 108. The dashboard may indicate that the connectable cart is coupled with the cart AGV 116 and the labels have been assigned to the connectable cart.

At 420, the REX 132 may release the cart to pick. For instance, the REX 132 may release the cart AGV 116 to navigate away from the induction area 308 to, for instance, the pick-to-cart area 302 based on an automatic determination that the cart AGV 116 is coupled to the connectable cart and the labels have been scanned into the cart record, or, for instance, based on a confirmatory input from a picker into the dashboard.

In some implementations, the REX 132 may receive, via the dashboard, a confirmation input from a picker that the cart AGV 116 is connected to the connectable cart and is ready to be released to pick. For example, the cart AGV 116 may be released to navigate to the pick-to-cart area 302 where items will be picked to the cartons on the cart AGV 116.

At 430, the REX 132 may select a pick-cell station 316 from a plurality of pick-cell stations in the operating environment. In some implementations, the pick-cell station 316 may be selected based on a queue or projected load of cart AGVs 116 at each of the plurality of pick-cell stations, proximity to items to be picked, availability, presence of items (e.g., in modular storage units 702) already staged at the pick-cell station 316, speed of picker, or other criteria.

At 432, the REX 132 may create tasks for cart AGVs 116 and/or picking AGVs 114, for example, using a navigation marker database. For instance, the task list may include a series of items to be picked, and the order and AGV assigned to perform the picks may be selected based on the locations of items assigned to be picked. For instance, the task list may include a series of items and corresponding locations in a pick-to-cart area 302 for picking using a cart AGV 116. The task list may also or alternatively include a series of items and corresponding locations in a high-density storage area 304 for retrieval using a picking AGV 114.

At 434, the REX 132 may store the tasks for the cart AGVs 116 and/or the picking AGVs 114.

At 436, the REX 132 may instruct one or more picking AGVs 114 to retrieve one or more containers, modular storage units 702, or other items, from the high-density storage area 304 or, potentially, from another area of the operating environment (e.g., another pick-cell station 316). For instance, the REX 132 may transmit a signal identifying high-density items, modular storage units 702 in which the items are stored, locations of the modular storage units 702, etc., to one or more picking AGVs 114 (e.g., multiple picking AGVs 114 may be employed to distribute the work of modular storage unit 702 transport). Other information such as identification of a designated pick-cell station 316 and time window for the items to be at the designated pick-cell station 316, routing directions, priority, traffic of other AGVs, modular storage unit 702 dimensions, etc., may also be transmitted in the signal to the picking AGV(s) 114.

The picking AGV(s) 114 may autonomously navigate to a location of a first modular storage unit 702 in a high-density storage area 304 and may retrieve it from the location (e.g., from a storage shelving unit at the location).

In some implementations, the picking AGV(s) 114 may also retrieve a second item from the high-density storage area 304. For instance, a picking AGV 114 may autonomously navigate to a second location of a second modular storage unit 702 in the high-density storage area 304 and retrieve it from the second location. The path of a picking AGV 114 may be determined to efficiently retrieve each modular storage unit 702. Additionally, in circumstances where multiple modular storage units 702 have a certain item, a particular modular storage unit 702 may be selected based proximity of the multiple modular storage units 702 to an assigned pick-cell station 316 and/or the picking AGV 114.

At 438, the picking AGV(s) 114 may navigate to the selected pick-cell station 316 and, at 440 may place the container at the selected pick-cell station 316, for example, as described above.

At 422, the cart AGV 116 may navigate to a next location. For instance, the cart AGV 116 may navigate to a sequential location in a task list, which sequential location may correspond to a location of an item in an order assigned to the cart/cart AGV 116. For instance, a REX 132 may instruct the cart AGV 116 to navigate (e.g., propel the connectable cart) to a location of a first item in the pick-to-cart area 302 based on a task list (e.g., generated in 432 or during induction, depending on the implementation). For example, the cart AGV 116 may navigate to a bay (e.g., a shelving bay) where a pick-to-cart item in one or more orders assigned to the cart is stored. For example, a guidance system coupled with the cart AGV 116 may read navigation markers and follow them until a destination defined by the REX 132 (or another component of the system 100) is reached. For instance, the cart AGV 116 may stop adjacent to the location where the item is stored (e.g., in front of a storage shelving unit).

At 424, the WMS 104 may assign a pick at the location to a picker, for example, via voice, light, or other output of the picking system 108. In some implementations, the picking system 108 may output an instruction to a picker on an output device, the instruction identifying the item and quantity to be picked at that location. In some implementations, the picking system 108 may coordinate lights or screens on the cart indicating into which carton an item is to be placed and/or lights on a shelving bay/location of the item in the pick-to-cart area 302 indicating the storage location of the item. Other systems, such as audio (e.g., pick-to-voice), a mobile computing device indicating the location of the item, etc., are possible.

At 426, the WMS 104 may receive a confirmation message input from the picker confirming the pick into a computing device of the picking system 108. For example, the input may include one or more messages indicating that an item (e.g., a specific item in one of the orders assigned to the cart) has been picked from the location and put on the cart AGV 116, for example, into a carton on the connectable cart coupled with the cart AGV 116.

At 428, the WMS 104 may send a message to the REX 132 indicating that the pick(s) at the location have been completed, in response to which, at 444, the REX 132 may update the picks, for example in the task list and/or cart record, to indicate that the first item has been picked to the cart/cart AGV 116.

The REX 132 may determine, at 446, whether an additional item in the task list is assigned to be picked to the cart AGV 116 from the pick-to-cart area 302 (e.g., also referred to as a P2C or pick-to-cart pick).

In response to determining that there is an additional item in the task list to be picked to the cart AGV 116, the REX 132 may instruct the cart AGV 116 to return to the operation at 422 to navigate to the next location of the additional item in the pick-to-cart area 302 based on the task list. In some implementations, the order of locations visited by the cart AGV 116 is based on a picking list configured to order the picking according to a designated path through the pick-to-cart area 302.

In response to a negative determination at 446, the method may continue to 448, where the REX 132 determines whether there are picks at the pick-cell station assigned to one or more of the cartons assigned to the cart/cart AGV 116. For instance, the REX 132 may determine whether there are items in the high-density storage area 304 also assigned to one or more cartons transported by the cart AGV 116. For example, if one or more of the orders assigned to the cart AGV 116 (e.g., as described above) includes an item that is to be retrieved by a picking AGV 114, the REX 132 may direct the cart AGV 116 to navigate to the pick-cell station 316 where the item from the picking AGV 114 may be picked to the cart AGV 116 (e.g., to a carton in the connectable cart).

If there are no pick-cell picks, the method may proceed to 480, described below.

If there are pick-cell picks, the REX 132 may determine, at 450, whether the selected pick-cell station 316 is available. For example, the REX 132 may determine whether another cart AGV 116 is already at the selected pick-cell station 316 or if there is another reason that the selected pick-cell station 316 may not be available, such as that a picker at the pick-cell station is on a break, the pick-cell station is temporarily out of order, etc.

In response to determining that the selected pick-cell station 316 is not available, the REX 132 may transmit a signal to the WMS 104, which may assign, at 452, a picker associated with the cart AGV 116 to another cart AGV 116, for example, using voice. In some implementations, the cart AGV 116 may be reassigned to a different pick-cell station 316 either automatically by the REX 132 or by a picker using the picking system 108.

At 454, the REX 132 may signal a current picker in the selected (or reassigned) pick-cell station 316 to stay in the pick-cell station 316 to wait for the cart AGV 116 and/or one or more picking AGVs 114.

At 456, the cart AGV 116 may enter a queue on a main buffer (e.g., waiting for one of a plurality of pick-cell stations 316) or a pick-cell station buffer (e.g., waiting for the selected pick-cell station 316).

If the determination at 450 is that the selected pick-cell station 316 is available or that the pick-cell buffer has cleared, the method may continue to 458, where the cart AGV 116 may navigate to the pick-cell station 316. For instance, the cart AGV 116 may autonomously navigate to the selected pick-cell station 316 to pick-cell picks. This may be done in coordination with one or more picking AGVs 114 delivering items to the pick-cell station 316.

At 460, the REX 132 may present a picking instruction in the pick-cell station 316 to a pick-cell picker, for example, in response to the cart AGV 116 (and/or the picking AGV 114) arriving at the pick-cell station 316. For instance, the picking system 108 may output instructions via an output device to a pick-cell picker indicating to place an item from a picking AGV 114 (e.g., in a modular storage unit 702 or other carton delivered by the picking AGV 114) into a carton along with an item picked using the cart AGV 116. For instance, the picking system 108 may direct the pick-cell picker to pick an item from a modular storage unit 702 delivered to the pick-cell station 316 by a picking AGV 114 and put the item in a particular carton (e.g., the carton to which the item was assigned, as described above) held on a connectable cart of the cart AGV 116.

At 462, the WMS 104 or REX 132, may receive a pick confirmation confirming that an item has been picked by the pick-cell picker from a container, such as a modular storage unit 702. For instance, the pick-cell picker may use a computing device of the picking system 108 to scan a label of the item or container in which the item is stored to confirm the pick, although it should be noted that other methods of confirming the pick (e.g., using voice or a button) are possible.

At 464, the WMS 104 or REX 132, may receive a put confirmation message indicating that an item has been put into the carton by the pick-cell picker. For instance, the pick-cell picker may use a computing device of the picking system 108 to scan a cart label or carton label indicating the carton into which the picker put the item. The picker may also or alternatively confirm the put with voice or other input. For instance, the picker may place the item into a carton along with an item that was put into the carton using the cart AGV 116 in the pick-to-cart area 302.

In response to receiving the put confirmation (whether directly from the picking system 108 or from the WMS 104), at 466, the REX 132 may update the task list in the database to indicate that the pick and put have been completed for the item.

At 468, the REX 132 may release the container from the pick-cell station and generate a task, for instance, for a picking AGV 114 to store the container back to the high-density storage area 304. In some implementations, the container may not be released unless all picks from that container to the cart/cart AGV 116 have been performed.

The REX 132 may signal the picking AGV 114 (e.g., the same picking AGV 114 that delivered the container, a next available picking AGV 114, or another selected picking AGV 114) to store the container, in response to which, at 474, the picking AGV 114 may retrieve the container from the pick-cell station 316.

At 476, the picking AGV 114 may navigate to a storage shelf in the high-density storage area 304 and, at 478 may place the container on the storage shelf. For instance, the picking AGV 114 may store the container at a location where the container was stored prior to being retrieved above or, the REX 132 may direct the picking AGV 114 to store the container at a different location, for example, based on availability of storage shelves, projected demand for items in the container, quantity of items remaining in the container, or other criteria.

At 472, the REX 132 may determine whether there are additional pick-cell picks for the cart AGV 116 (e.g., for the cartons held by the cart/cart AGV 116) at the pick-cell station 316. If there are additional pick-cell picks for the cart AGV 116, the method may return to the operation at 460 to present an instruction to the pick-cell picker for the next pick-cell pick.

In response to determining, at 448 that there are no pick-cell picks or determining, at 472 that there are no additional picks in the pick-cell station 316, the REX 132 may instruct the cart AGV 116 to go to the finalizing area 314, and at 482, the cart AGV 116 may navigate to the finalizing area. For instance, the REX 132 may instruct the cart AGV 116 to propel the connectable cart to the finalizing area 314.

At 484, the cart AGV 116 may detach from the connectable cart in the finalizing area 314. In some implementations, the cart AGV 116 may then return to an induction area 308 to attach to another connectable cart.

At 486, the REX 132 may provide a dashboard for finalizing and receive input for the same. For instance, an associate in the finalizing area 314 may finalize the cart using the dashboard and/or using the WMS 104. In some implementations, the associate may remove the carton(s) from the connectable cart, verify the contents a carton, close the cartons, place the cartons on a conveyer to go to a shipping area, and confirm on the dashboard that the cartons have been finalized.

At 488, in some implementations, the associate may use the dashboard or other input method to release the cart (e.g., the connectable cart) to induction, in response to which the REX 132 directs a cart AGV 116 (e.g., a next available or other cart AGV 116) to attach to the released cart in the finalizing area at 490. At 492, the cart AGV 116 may navigate to the induction area 308 with the cart.

Figure 5:
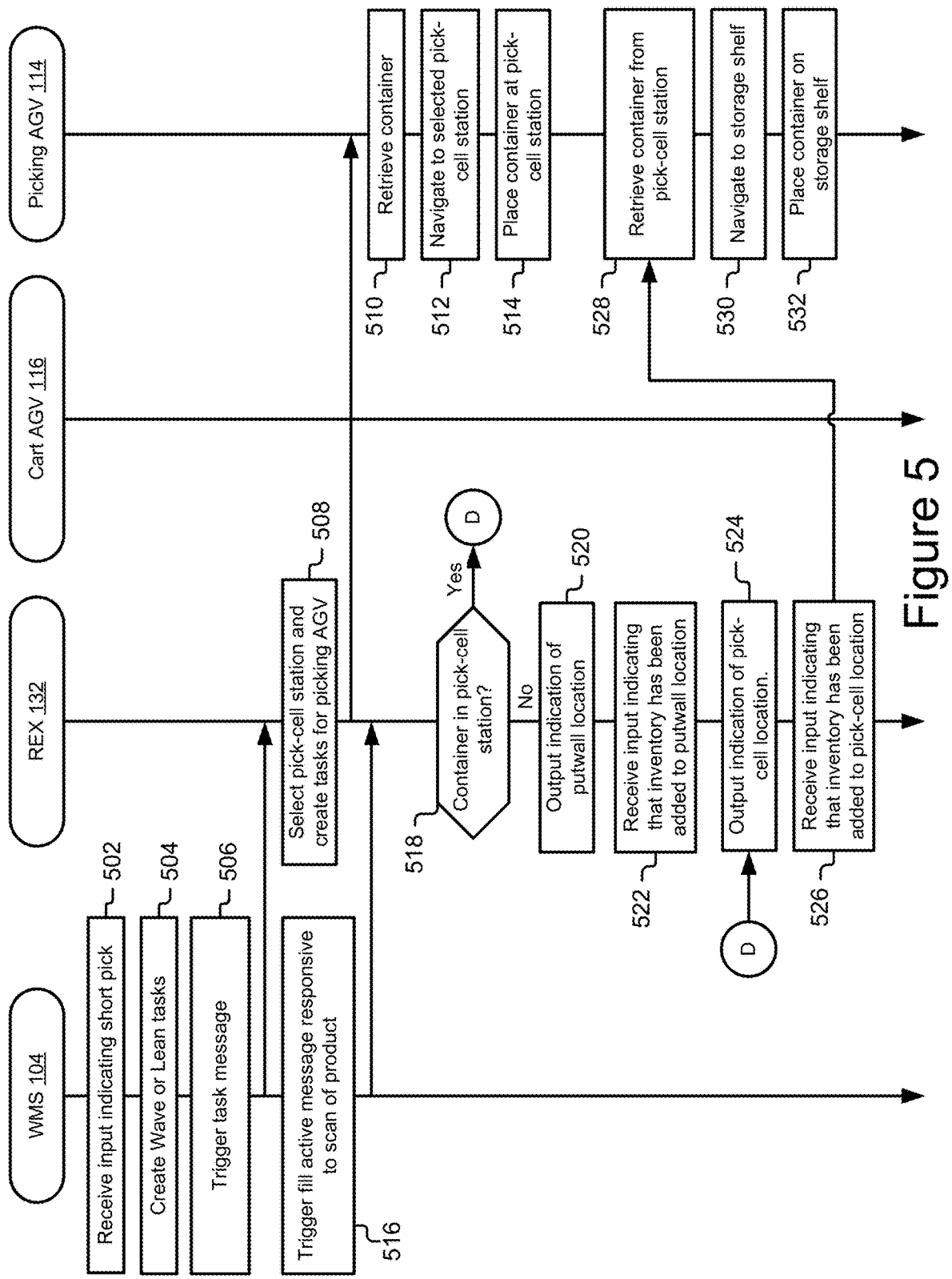
FIG. 5 is a data-flow diagram of an example method of replenishing a supply of items in a container.

FIG. 5 is a data-flow diagram of an example method of replenishing a supply of items in a carton. At 502, a WMS 104 may receive input indicating a short pick (e.g., an inventory of items that is insufficient to fill an order, below a defined threshold, etc.). In some implementations, the determination that there is a short pick may be made automatically by a component of the system 100 (e.g., the WMS 104, the REX 132, or WES 102) determining that a level of inventory in the order fulfillment facility or in a particular modular storage unit 702 is below a defined threshold quantity or percentage or is insufficient to fill an outstanding order. In some implementations, a picker (e.g., at a pick-cell station 316) may provide an input indicating an insufficient or low quantity of items are in a modular storage unit 702.

In implementations, where an input indicating an insufficient quantity of items is in the modular storage unit 702 is received during a pick at a pick-cell station 316, the picking system 108 or WMS 104 may provide instructions to the picker to leave the order (e.g., a carton corresponding to the order) in a cart coupled with the cart AGV 116 until the pick is fulfilled.

At 504, the WMS 104 may create wave or lean tasks. A wave task may be, for example, a request for an emergency replenishment, such as when an order is set to be filled, but the system (e.g., the WMS 104 or REX 132) determines that there are insufficient items in one or more modular storage units 702 to fill the order. A lean task may indicate that an inventory (e.g., in one or more modular storage units 702) is below a defined threshold and that the inventory should be refilled.

At 506, the WMS 104 may trigger a task message to be created and sent to the REX 132, in response to a wave or a lean task being created.

In response to receiving the task message, at 508, the REX 132 may select a pick-cell station 316 or, in some instances, a station in the replenishment area 318 to which a container may be sent for replenishment. The REX 132 may then create a task for a picking AGV 114 to retrieve the container from a location in the order fulfillment facility, such as a high-density storage area 304.

The REX 132 may send the task to a picking AGV 114, which may, at 510, 512, and 514, retrieve a container to be replenished, navigate to the selected pick-cell station 316, and place the container at the pick-cell station 316, for example, as described above in reference to 436, 438, and 440. The picking AGV 114 may navigate to a pick-cell station 316 or replenishment cell station in the replenishment area 318, depending on the implementation.

At 516, the WMS 516 may trigger a fill active message responsive to a scan of the product, for example, in the replenishment area 318.

At 518, the REX 132 may determine whether the container is at the pick-cell station 316. In response to determining that the container is not at the pick-cell station 316, the REX 132 may output an indication of a putwall location at 520. A putwall may include a storage unit or container containing a case of items that are to be put, for example, into the container. For instance, outputting indication of the putwall location may include lighting up the putwall location containing the item(s) that are to be placed into the retrieved container.

At 522, the REX 132 may receive an input indicating that inventory of an item has been added to the putwall location and may, in some instances, continue to 524.

In response to determining that the container is at the pick-cell station 316, the REX 132 may output an indication of a location at the pick-cell station 316 at 524. For example, the REX 132 may light up a pick-cell location to identify the container thereby identifying to the picker the container that is ready to be replenished. In some implementations, the REX 132 may also output other information regarding SKUs, quantities, or other information for the items that are to be placed in the container by the picker.

At 526, responsive to receiving a confirmatory input from the picker (e.g., via voice, input into a graphical interface, or pressing a button at the pick-cell station 316) that inventory has been added to a container at the pick-cell station 316 (e.g., from the putwall location), the REX 132 may signal a picking AGV 114 to retrieve the container from the pick-cell station 316 and store it in the high-density storage area 304.

At 528, 530, and 532, the picking AGV 114 may retrieve the container from the pick-cell station 316, navigate to a storage shelf, and place the container on the storage shelf, for example, as described in reference to 474, 476, and 479 above.

Figure 6B:
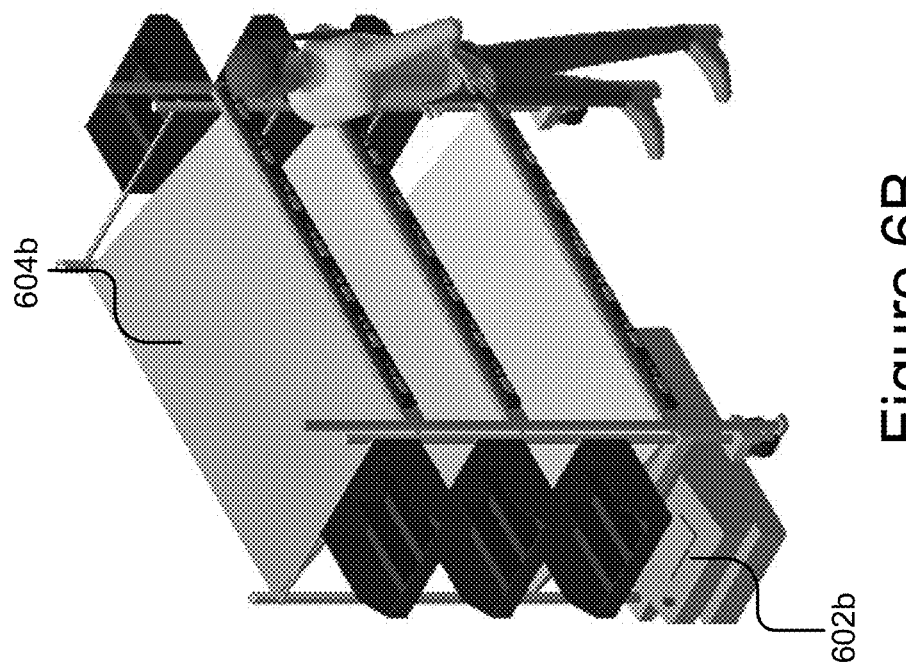
FIGS. 6A and 6B are illustrations of example cart automated guided vehicles.
Figure 6A:
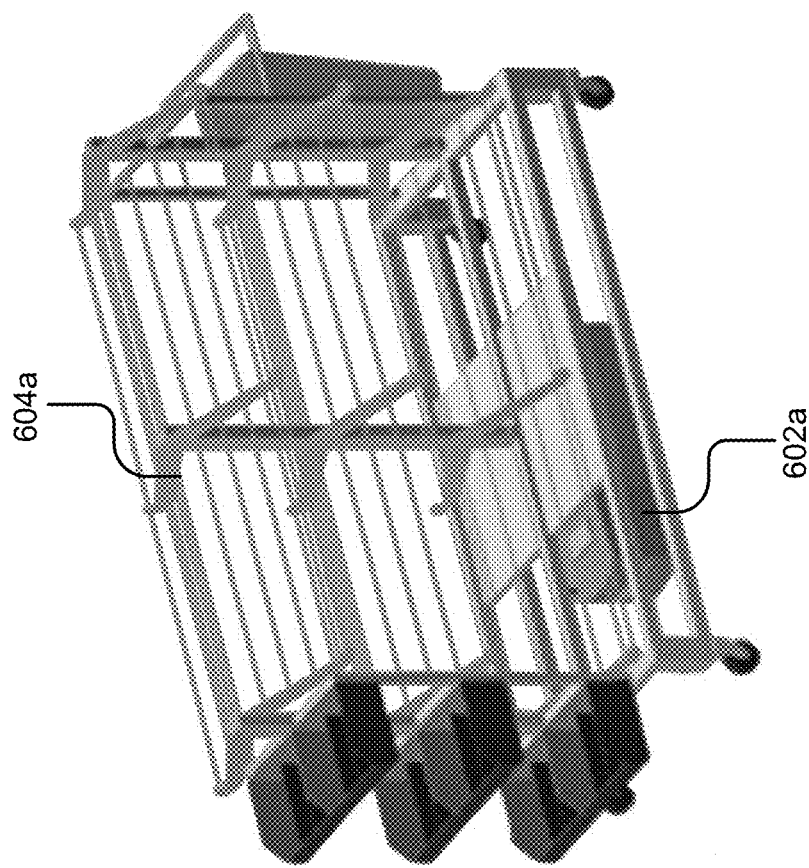

FIGS. 6A and 6B are illustrations of example cart AGVs 602a and 602b (e.g., also referred to herein as 116). The example cart AGVs may include a cart AGV 602 or robot configured to autonomously transport pick-to-cart items, as described above. The cart AGV 602 may include or be adapted to autonomously transport a carton holder 604a or 604b (e.g., a cart or shelves) that is adapted to hold cartons (not shown in FIGS. 6A or 6B). For example, a cart AGV 602 may push/pull a carton holder 604, which may correspond to a connectable cart. In some implementations, a carton may be a box placed on a shelf of the carton holder 604.

As illustrated in FIGS. 6A and 6B, the cart AGV 602 may include a substantially rectangular body and may include or be coupleable to a connectable cart having shelves (e.g., the carton holder 604*a* or 604*b*). The cart AGV 602 may couple to a connectable cart via a coupling mechanism and matching coupling component (e.g., a latch mechanism coupling the cart AGV 602 to the connectable cart). In some instances, the shelves may be angled for easy loading of cartons to be filled with picked items.

In some implementations, the cart AGV 602 may also include a guidance system that may detect, for instance, a human picker associated with the cart AGV 602 (e.g., via a tracking device on the picker, optical recognition, etc.), determine the picker's position, and reposition itself automatically based on the picker's position by comparing the cart AGV's 602 position and the picker's position, and a pre-determined offset (e.g., a distance in front of, behind, and/or next to the picker). This advantageously allows the cart AGV 602 to follow the picker.

Figures 7A, 7B:
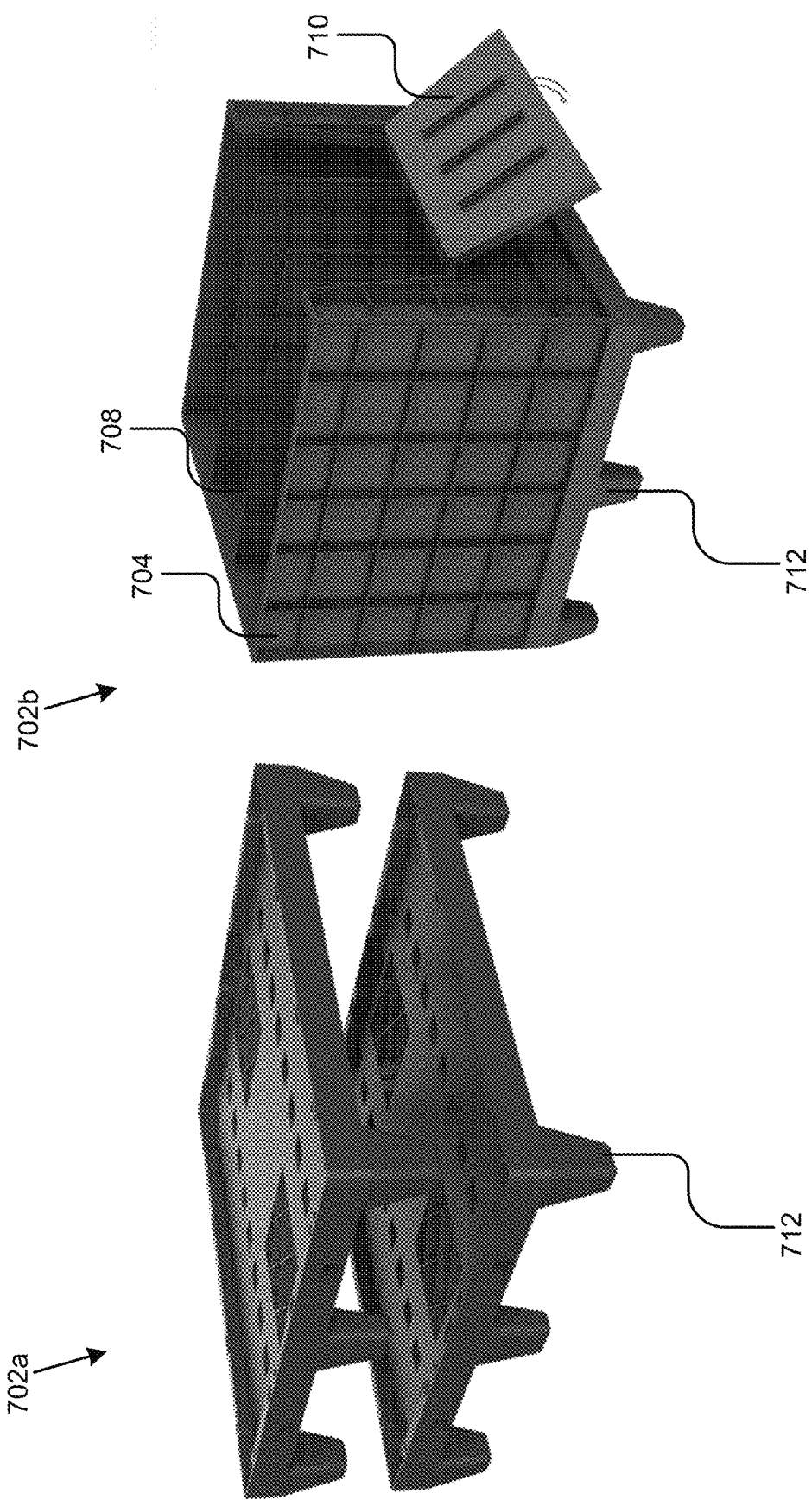
FIGS. 7A-7B are illustrations of example modular storage units.

FIGS. 7A-7B are illustrations of example modular storage units 702*a* and 702*b* (also referred to herein as containers or modular containers). In some implementations, the modular storage units 702 are containers or sets of containers that may be moved between storage shelves, pick cells 382, etc. Modular storage units 702 may have various heights and widths (e.g., 2 to 24 inches high, and 1, 2, or 4 feet wide) and depths equal to the depths of shelving units (e.g., 18 to 24 inches). For example, the modular storage units 702 may be sized and configured to hold items commonly stocked in a fulfillment or order fulfillment facility while also fitting onto standard shelves. A modular storage unit 702 may include a holding structure (e.g., a mini-pallet as in 7A or a tote as in 7B) adapted to hold items. The holding structure may be adapted to interface with a CHM 816 and carrying surface 820 (e.g., a fork) of a picking AGV 114.

As illustrated in FIG. 7A, a modular storage unit 702*a* may comprise a pallet, tote, or other holding vessel to support items designed to be picked up by a picking AGV 114 using the CHM 816. For example, a modular storage unit 702*a* may include a pallet and a holding structure that supports items designed to be picked up by an AGV with forks or another carrying surface 820. In some implementations, a pallet may be stackable. In some implementations, a pallet may be attachable to a container to form a modular storage unit 702 such as the example depicted in FIG. 7B.

FIG. 7B illustrates another example modular storage unit 702*b*. As illustrated, a modular storage unit may include sides 704 and one or more divisions 708 dividing the modular storage unit 702*b* into multiple compartments. Further, in some implementations, a modular storage unit 702*b* may include a door 710, which may be opened and closed by a picker to provide easy access to items stored in the compartments. In some implementations, a picking AGV 114 may automatically position the door 710 toward the center of a pick-cell station 316 to allow access by a picker.

In some implementations, a modular storage unit 702 may include supports 712 that support the modular storage unit 702 on a shelf, so that a carrying surface 820 of the CHM 816 may slide under the modular storage unit 702 to pick the modular storage unit 702 up, as described elsewhere herein. It should be noted that although the supports 712 are illustrated as protrusions from the bottom of a modular storage unit 702, other support structures (e.g., a substantially flat structure) may be attached to the bottom or another surface of the modular storage unit 702. In some implementations, a modular storage unit 702 may include a handling component that interacts with a carrying surface 820 of a picking AGV 114 to facilitate removal of the modular storage unit 702 from a storage shelf by the picking AGV 114. The handling component may be positioned on bottom, top, side, or front of the modular storage unit 702. For example, a handling component may include a latch, French cleat, slots or arms for receiving prongs of the carrying surface 820 (e.g., a fork), a bottom surface, indentation(s), preconfigured channel(s), or other structures or formations that may be used by the carrying surface 820 to support the modular storage unit 702. Accordingly, a carrying surface 820 of a picking AGV 114 may be compatibly engageable with the coupling portion of the modular storage unit 702 to lift the modular storage unit 702 from a first target shelving unit, retain the modular storage unit 702 during handling, and place the modular storage unit 702 on a second target shelving unit.

FIG. 8 depicts an example picking AGV 114, which may include an AGV body 810, a drive unit 812 housed within or coupled to the body 810, a power source (not shown) housed within or coupled to the body 810, an AGV item storage rack 806 with one or more AGV shelves 814, a CHM 816, a carrying surface 820, a guidance system (not shown), and one or more controllers (not shown), although other configurations are possible and contemplated herein.

The body 810 may include a front, a rear opposing the front, a left side extending from the front to the rear, and a right side opposing the left side and extending from the front to the rear. While various shapes and construction materials to the body 810 are possible, the body 810 may be configured to fit between rows of storage shelving in a high-density storage area 304. The body 810 may be configured to house a drive unit 812, power source, controller, and/or other components of the picking AGV 114.

The drive unit 812 may be coupled to the body 810 and configured to receive power from the power source to provide motive force to the picking AGV 114 and propel the picking AGV 114 within an operating environment. In some implementations, the drive unit 812 may receive instructions from one or more controllers instructing the drive unit 812 to cause the picking AGV 114 to move forward, backward, sideways, turn, or perform another movement. In some implementations, the drive unit 812 may include electric motors and wheels, although other configurations, such as treads are possible.

The drive unit 812 may be wirelessly coupled via a controller to a wireless interface and a wireless communications network to receive control signals from the dispatch system 106 and/or other components of the system 100.

The power source may be coupled to the components of the picking AGV 114 to provide power to the components, for example, the power source may provide power to the CHM 816, the drive unit 812, a controller, or another component of the picking AGV 114. The power source may include a battery, a wire, contact track in the operating environment, induction charger, alternator or gas generator, etc.

Some implementations of the picking AGV 114 may include an AGV item storage rack 806 (also referred to as AGV rack 806). While the AGV rack 806 is illustrated as coupled to the top of the body 810, other configurations are possible, for example, the AGV rack 806 may be coupled in front of, behind, to the side of, or even towed or pushed by the picking AGV 114. The AGV rack 806 may be positioned proximate to the CHM 816, so that the shelves 814 are within reach of the CHM 816 for the CHM 816 to place items on the shelves 814.

The AGV rack 806 may include a single shelf 814 or a plurality of shelves 814 coupled to a frame. The shelves 814 may include flat surfaces, bays, containers, or other mechanisms for holding a modular storage unit 114 or other item. At least one of the shelves 814, where equipped, is capable of storing the item during transit of the picking AGV 114.

The plurality of shelves 814 may be vertically arranged and, in some implementations, one or more of the shelves 814 may have an adjustable height (e.g., adjusted manually or automatically using a motor coupled with the picking AGV 114) on the AGV rack 806. In some implementations, a controller of the picking AGV 114 may determine a current height of a particular shelf of the plurality of shelves 814, for example, using an optical scanner or retrieving a stored height of an the particular shelf from a database (e.g., on the data store 120). For example, one or more of the shelves 814 may include a marker readable by an optical scanner coupled with the CHM 816 or carrying surface 820 to indicate to the CHM 816 a location or identification of the a particular shelf. In some implementations, a controller of the picking AGV 114 may store a shelf identifier for a shelf 814 in association with a height or size of the shelf 814, or an identifier of an item or modular storage unit 702 stored on the shelf 814.

In some implementations, a shelf 814 onto which an item is placed may be selected based on the size, height, weight capacity, or other attributes of the shelf 814. For example, a modular storage unit 702 of a given size may be placed on a shelf 814 having a corresponding size. In another example, a modular storage unit 702 having a threshold weight may be placed on a lower shelf 814 of the AGV rack 806 than a modular storage unit 702 having a lighter weight than the threshold.

The container handling mechanism or CHM 816 may include an extender for extending a carrying surface 820 from a picking AGV 114 to a storage shelving unit that is separate from the picking AGV 114. The CHM 816 may have three or more degrees of freedom to move the carrying surface 820 along three or more axes thereby allowing the CHM 816 to retrieve an item from a first target shelving unit using the carrying surface 820 and the three or more degrees of freedom and place the item on a second target shelving unit.

In some implementations, the CHM 816 may include a mast having an elevator 808 coupled with the body 810 and/or AGV rack 806. The elevator 808 lifts and lowers a platform 818 supporting a carrying surface 820. The elevator 808 moves the CHM 816 along a Z axis to lift and set down the container.

In some implementations, the platform 818 extends or retracts the carrying surface 820 horizontally between the picking AGV 114 and a storage shelving unit. In some implementations, the platform 818 may also extend or retract the carrying surface 820 into or out of one or more of the AGV shelves 814 to place an item on one of the AGV shelves 814. The CHM 816 includes a moveable platform 818 having a carrying surface 820 capable of translating along a plane in two or more dimensions and/or rotating about a vertical axis. For example, the platform 818 (or other component of the CHM 816, depending on the implementation) may translate the carrying surface 820 along any X and Y coordinates (e.g., sideways/left and right relative to the front of the picking AGV 114; forward and backward relative to the front of the picking AGV 114; etc.). This allows the CHM 816 to retrieve an item from a storage shelf and move it to and place it on an AGV shelf 814 supported by the frame, and vice versa. The CHM 816 may be adjustable to translate between an X axis, Y axis, a combination, etc.

In some implementations, the platform 818 may comprise two platforms coupled to one another, a first of which moves along a first horizontal axis and a second of which moves along a second horizontal axis perpendicular to the first horizontal axis. For instance, the first platform may be coupled with the elevator 808 and the second platform, so that the first platform may move the second platform along the first horizontal axis. The second platform may be coupled with the first platform and the carrying surface 820, so that the second platform may move the carrying surface 820 along the second horizontal axis.

The CHM 816 may be capable of moving items between the different shelves 814 in the AGV rack 806, one or more storage shelving units in a high-density storage area 304, one or more pick cells 382 in a pick-cell station 316, and, in some instances, to or from other target shelves (e.g., in an induction area 308, replenishment area 318, etc.).

In some implementations, the picking AGV 114 may include a scanner coupled with the carrying surface 820, platform 818, etc., that can read signatures or markers to determine location. For example, the scanner may be an optical scanner configured to read visual identifiers (e.g., labels including a QR code, bar code, etc.) to determine which shelf 814 the CHM 816 or the carrying surface 820 is aligned with. The optical scanner may scan a shelf marker on one or more of the AGV shelf 814 or a detached storage shelf. The shelf marker may indicate a position and/or identification code of shelves and/or modular storage units 702, for example.

In some implementations, the elevator 808 may include positional sensors to determine the position of CHM 816 and/or align the carrying surface 820 with a target shelf (whether an external or integrated with the picking AGV 114).

The carrying surface 820 may be coupled to or integrated with the CHM 816 and is configured to support a modular storage unit 702 or other item. In some implementations, the carrying surface 820 is connected at a distal end of the CHM 816 or extender. The carrying surface 820 may be movable by the CHM 816 vertically parallel relative to a face of the AGV rack 806, perpendicularly relative to the face of the AGV rack 806, and horizontally parallel relative to the face of the AGV rack 806. The carrying surface 820 may be extendable by the CHM 816 using the three or more degrees of freedom to retrieve a certain item or modular storage unit 702 from a separate shelving unit located within reaching distance of the CHM 816 and retractable using the three or more degrees of freedom to place the certain item on one of the AGV shelves 814 of the AGV rack 806.

In some implementations, the carrying surface 820 may be adapted to interface with a modular storage unit 702, as described in reference to FIG. 2B. For example, the carrying surface 820 is compatibly engageable with a handling component of the modular storage unit 702 to lift the modular storage unit 702 from the separate shelving unit, retain the modular storage unit 702 during handling, and place the modular storage unit 702 on the one of the shelves 814 of the AGV rack 806.

In some implementations, the carrying surface 820 may include forks, which are designed to engage with a corresponding support structure (e.g., the handling component or supports 712) of the modular storage unit 702. The carrying surface 820, may be made of any material, such as plastic or metal, which is sufficiently strong to support a modular storage unit 702 or other item.

The picking AGV 114 may include a guidance system that determines a location of the picking AGV 114 within the operating environment. For instance, the guidance system may include one or more sensors that detect and process navigation markers (e.g., QR codes, RFID labels, etc.) to locate the picking AGV 114 as the picking AGV 114 traverses the operating environment. The guidance system may be coupled to a controller of the picking AGV 114, which may, in some instances, include local object detection intelligence and processing to avoid collision with other objects (e.g., AGVs, humans, items, storage shelving units, etc.) in the operating environment.

The picking AGV 114 may include one or more controllers coupled with the guidance system, CHM 816, drive unit 812, dispatch system 106, etc., to perform the operations described herein. For instance, the one or more controllers may receive a signal from the REX 132 (e.g., via the dispatch system 106) and signal the drive unit 812 to propel the picking AGV 114. The one or more controllers may communicate with the guidance system to determine a location of the picking AGV 114 within the operating environment and, using the drive unit 812, navigate through the operating environment. The one or more controllers may receive a signal from the REX 132 indicating to retrieve a particular item from a target storage unit, in response to which, the one or more controllers may instruct the drive unit 812 to position the CHM 816 adjacent to the target shelving unit using the current location determined by the guidance system and then direct the CHM 816 to retrieve the item.

Figure 9:
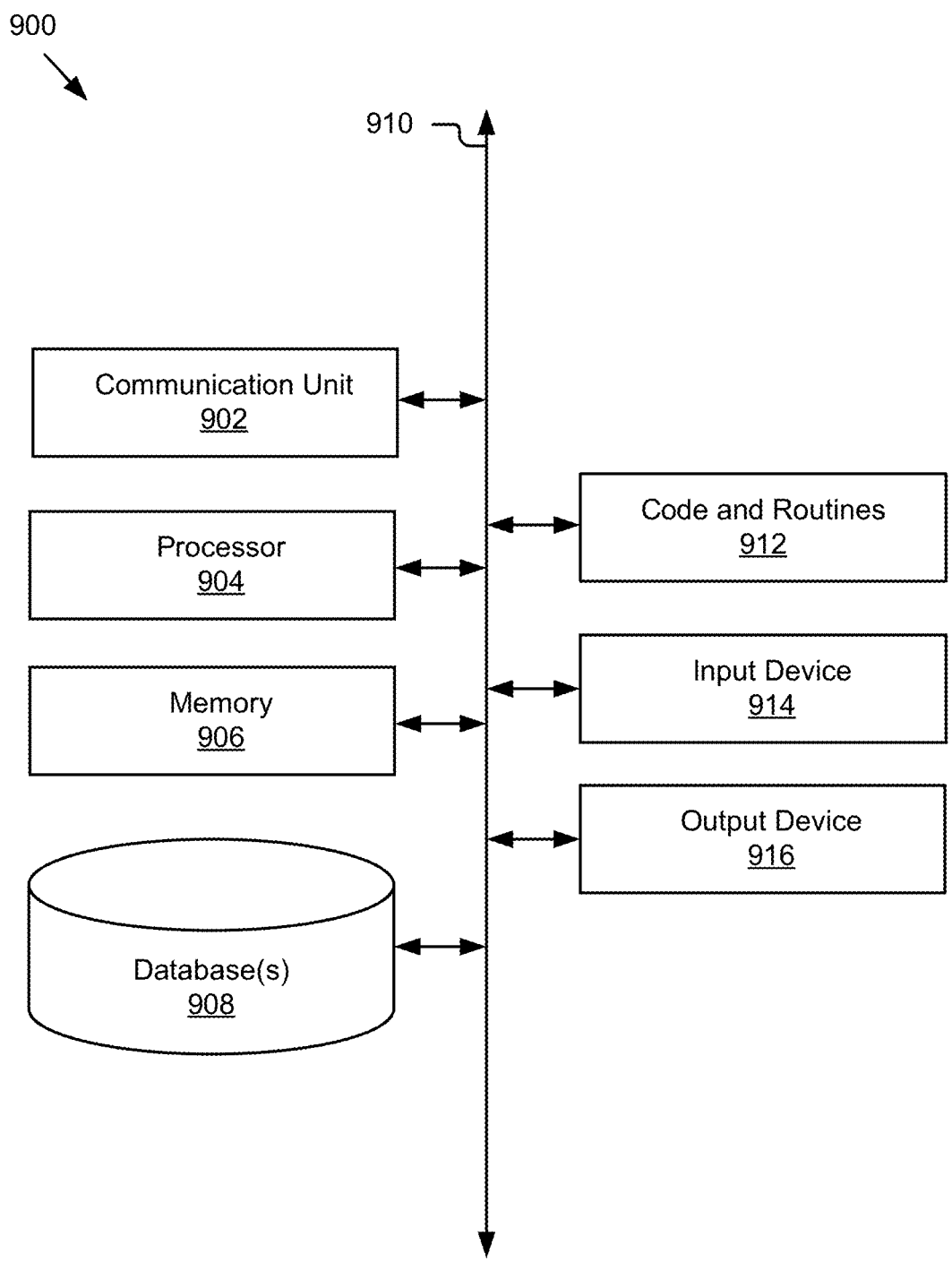
FIG. 9 is a block diagram illustrating an example computing device.

FIG. 9 is a block diagram illustrating an example computing system 900. The example computing system 900 may correspond to a WES 102, a WMS 104, a dispatch system 106, a picking system 108, or a REX 132, or a component thereof, for example.

The code and routines 912 may include computer logic executable by the processor 904 on a computing system 900 to provide for to provide the functionality describe in reference to one or more of the components of the system 100.

As depicted, the computing system 900 may include a processor 904, a memory 906, a communication unit 902, an output device 916, an input device 914, and database(s) 908, which may be communicatively coupled by a communication bus 910. The computing system 900 depicted in FIG. 9 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 900 may include various operating systems, sensors, additional processors, and other physical configurations. Although, for purposes of clarity, FIG. 9 only shows a single processor 904, memory 906, communication unit 902, etc., it should be understood that the computing system 900 may include a plurality of one or more of these components.

The processor 904 may execute software instructions by performing various input, logical, and/or mathematical operations. The processor 904 may have various computing architectures to method data signals including, for example, a complex instruction set computer (CISC) architecture, a reduced instruction set computer (RISC) architecture, and/or an architecture implementing a combination of instruction sets. The processor 904 may be physical and/or virtual, and may include a single core or plurality of processing units and/or cores. In some implementations, the processor 904 may be capable of generating and providing electronic display signals to a display device, supporting the display of images, capturing and transmitting images, performing complex tasks including various types of feature extraction and sampling, etc. In some implementations, the processor 904 may be coupled to the memory 906 via the bus 910 to access data and instructions therefrom and store data therein. The bus 910 may couple the processor 904 to the other components of the computing system 900 including, for example, the memory 906, the communication unit 902, the input device 914, the output device 916, and the database(s) 908.

The memory 906 may store and provide access to data to the other components of the computing system 900. The memory 906 may be included in a single computing device or a plurality of computing devices. In some implementations, the memory 906 may store instructions and/or data that may be executed by the processor 904. For example, the memory 906 may store the code and routines 912. The memory 906 is also capable of storing other instructions and data, including, for example, an operating system, hardware drivers, other software applications, databases, etc. The memory 906 may be coupled to the bus 910 for communication with the processor 904 and the other components of computing system 900.

The memory 906 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 904. In some implementations, the memory 906 may include one or more of volatile memory and non-volatile memory (e.g., RAM, ROM, hard disk, optical disk, etc.). It should be understood that the memory 906 may be a single device or may include multiple types of devices and configurations.

The bus 910 can include a communication bus for transferring data between components of a computing device or between computing devices, a network bus system including a network or portions thereof, a processor mesh, a combination thereof, etc. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 902 may include one or more interface devices (I/F) for wired and wireless connectivity among the components of the system 100. For instance, the communication unit 902 may include various types known connectivity and interface options. The communication unit 902 may be coupled to the other components of the computing system 900 via the bus 910. The communication unit 902 may be electronically communicatively coupled to a network (e.g., wiredly, wirelessly, etc.). In some implementations, the communication unit 902 can link the processor 904 to a network, which may in turn be coupled to other processing systems. The communication unit 902 can provide other connections to a network and to other entities of the system 700 using various standard communication protocols.

The input device 914 may include any device for inputting information into the computing system 900. In some implementations, the input device 914 may include one or more peripheral devices. For example, the input device 914 may include a keyboard, a pointing device, microphone, an image/video capture device (e.g., camera), a touch-screen display integrated with the output device 916, etc.

The output device 916 may be any device capable of outputting information from the computing system 900. The output device 916 may include one or more of a display (LCD, OLED, etc.), a printer, a 3D printer, a haptic device, audio reproduction device, touch-screen display, etc. In some implementations, the output device is a display which may display electronic images and data output by the computing system 900 for presentation to a user, such as a picker or associate in the order fulfillment facility. In some implementations, the computing system 900 may include a graphics adapter (not shown) for rendering and outputting the images and data for presentation on output device 916. The graphics adapter (not shown) may be a separate processing device including a separate processor and memory (not shown) or may be integrated with the processor 904 and memory 906.

The database(s) are information source(s) for storing and providing access to data. The data stored by the database(s) 908 may organized and queried using various criteria including any type of data stored by them, such as the data in the data store 120 and other data discussed herein. The database(s) 908 may include file systems, data tables, documents, databases, or other organized collections of data. Examples of the types of data stored by the database(s) 908 may include the data described herein, for example, in reference to the data store 120.

The database(s) 908 may be included in the computing system 900 or in another computing system and/or storage system distinct from but coupled to or accessible by the computing system 900. The database(s) 908 can include one or more non-transitory computer-readable mediums for storing the data. In some implementations, the database(s) 908 may be incorporated with the memory 906 or may be distinct therefrom. In some implementations, the database(s) 908 may store data associated with a database management system (DBMS) operable on the computing system 900. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
assigning, by one or more processors, a set of shipping cartons to a cart, the cart being adapted to hold the set of shipping cartons and couple with a first automated guided vehicle (AGV) of one or more AGVs;
receiving, by the one or more processors, scan data of the set of shipping cartons indicating that the set of shipping cartons are held by the cart;
signaling, by the one or more processors, the first AGV to couple with the cart;
based on the scan data and the first AGV being coupled with the cart, signaling, by the one or more processors, the first AGV to navigate to a first location of a first item in a storage area of a fulfillment center, the first item being assigned to at least one of the set of shipping cartons;
outputting, by the one or more processors, a first instruction to one or more client devices instructing one or more pickers to remove the first item from storage in the storage area and place the first item into the at least one of the set of shipping cartons; and
based on determining that a plurality of pick tasks for the set of shipping cartons has been completed, signaling the first AGV to transport the cart holding the set of shipping cartons to a point in the fulfillment center outside of the storage area.

2. The method of claim 1, further comprising:
determining, by the one or more processors, that the first AGV is at the first location in the storage area;
outputting, by the one or more processors, the first instruction to the one or more client devices instructing the one or more pickers at the storage area to place the first item in a defined shipping carton of the at least one of the set of shipping cartons held by the cart;
receiving, by the one or more processors, second scan data of the defined shipping carton confirming that the first item has been picked into the defined shipping carton; and
instructing, by the one or more processors, the first AGV to navigate to a second location of a second item in the storage area based on the second scan data.

3. The method of claim 1, further comprising:
signaling, by the one or more processors, the first AGV to transport the set of shipping cartons from the first location to a picking station;
instructing, by the one or more processors, a second AGV of the one or more AGVs to deliver a second item to the picking station; and
outputting, by the one or more processors, a second instruction to the one or more client devices instructing the one or more pickers to place the second item into the set of shipping cartons on the cart at the picking station.

4. The method of claim 3, wherein instructing the second AGV to deliver the second item to the picking station includes:
signaling, by the one or more processors, the second AGV to transport a storage container holding the second item from a second storage area to the picking station and place the storage container on a shelf at the picking station.

5. The method of claim 4, wherein:
outputting the second instruction to the one or more client devices includes instructing the one or more pickers to remove the second item from the storage container on the shelf and place the second item in a defined shipping carton of the set of shipping cartons, the defined shipping carton containing the first item; and
the method includes receiving second scan data of the defined shipping carton confirming that the second item has been picked into the defined shipping carton and instructing the first AGV to transport the cart away from the picking station based on the second scan data.

6. The method of claim 3, further comprising:
selecting, by the one or more processors, the picking station from a plurality of picking stations in the fulfillment center based on one or more queues of the one or more AGVs at the plurality of picking stations; and
signaling, by the one or more processors, the first AGV to wait in a queue for the selected picking station.

7. The method of claim 1, further comprising:
determining, by the one or more processors, that the plurality of pick tasks for the set of shipping cartons have been completed, the plurality of pick tasks including placing a plurality of items into the set of shipping cartons; and
based on determining that the plurality of pick tasks have been completed, signaling, by the one or more processors, the one or more AGVs to transport the cart holding the set of shipping cartons to a finalizing area of the fulfillment center.

8. The method of claim 7, further comprising:
determining, by the one or more processors, that the cart is at the finalizing area; and
in response to determining that the cart is at the finalizing area, decoupling the one or more AGVs from the cart.

9. The method of claim 8, further comprising:
determining, by the one or more processors, that one or more finalizing tasks have been completed;

signaling, by the one or more processors, the one or more AGVs to couple with the cart at the finalizing area;
signaling, by the one or more processors, the one or more AGVs to transport the cart to an induction area of the fulfillment center; and
assigning, by the one or more processors, a second set of shipping cartons to the cart.

10. The method of claim 7, wherein:
the plurality of pick tasks including placing a first plurality of items into the set of shipping cartons at the storage area and placing a second plurality of items into the set of shipping cartons at a picking station; and
signaling, by the one or more processors, the one or more AGVs to transport the cart holding the set of shipping cartons to the finalizing area includes signaling the one or more AGVs to transport the cart from the picking station to the finalizing area.

11. A system comprising:
one or more processors; and
a non-transitory computer-readable medium storing computer instructions that, when executed by the one or more processors, cause the system to perform operations including:
assigning a set of shipping cartons to a cart, the cart being adapted to hold the set of shipping cartons and couple with a first automated guided vehicle (AGV) of one or more AGVs;
receiving scan data of the set of shipping cartons indicating that the set of shipping cartons are held by the cart;
signaling the first AGV to couple with the cart;
based on the scan data and the first AGV being coupled with the cart, signaling the first AGV to navigate to a first location of a first item in a storage area of a fulfillment center, the first item being assigned to at least one of the set of shipping cartons;
outputting a first instruction to one or more client devices instructing one or more pickers to remove the first item from storage in the storage area and place the first item into the at least one of the set of shipping cartons; and
based on determining that a plurality of pick tasks for the set of shipping cartons has been completed, signaling the first AGV to transport the cart holding the set of shipping cartons to a point in the fulfillment center outside of the storage area.

12. The system of claim 11, wherein the operations further comprise:
determining that the first AGV is at the first location in the storage area;
outputting the first instruction to the one or more client devices instructing the one or more pickers at the storage area to place the first item in a defined shipping carton of the at least one of the set of shipping cartons held by the cart;
receiving second scan data of the defined shipping carton confirming that the first item has been picked into the defined shipping carton; and
instructing the first AGV to navigate to a second location of a second item in the storage area based on the second scan data.

13. The system of claim 11, wherein the operations further comprise:
signaling the first AGV to transport the set of shipping cartons from the first location to a picking station;
instructing a second AGV of the one or more AGVs to deliver a second item to the picking station; and
outputting a second instruction to the one or more client devices instructing the one or more pickers to place the second item into the set of shipping cartons on the cart at the picking station.

14. The system of claim 13, wherein instructing the second AGV to deliver the second item to the picking station includes:
signaling the second AGV to transport a storage container holding the second item from a second storage area to the picking station and place the storage container on a shelf at the picking station.

15. The system of claim 14, wherein:
outputting the second instruction to the one or more client devices includes instructing the one or more pickers to remove the second item from the storage container on the shelf and place the second item in a defined shipping carton of the set of shipping cartons, the defined shipping carton containing the first item; and
the operations include receiving second scan data of the defined shipping carton confirming that the second item has been picked into the defined shipping carton and instructing the first AGV to transport the cart away from the picking station based on the second scan data.

16. The system of claim 13, further comprising:
selecting the picking station from a plurality of picking stations in the fulfillment center based on one or more queues of the one or more AGVs at the plurality of picking stations; and
signaling the first AGV to wait in a queue for the selected picking station.

17. The system of claim 11, wherein the operations further comprise:
determining that the plurality of pick tasks for the set of shipping cartons have been completed, the plurality of pick tasks including placing a plurality of items into the set of shipping cartons; and
based on determining that the plurality of pick tasks have been completed, signaling the one or more AGVs to transport the cart holding the set of shipping cartons to a finalizing area of the fulfillment center.

18. The system of claim 17, further comprising:
determining that the cart is at the finalizing area; and
in response to determining that the cart is at the finalizing area, decoupling the one or more AGVs from the cart.

19. The system of claim 18, wherein the operations further comprise:
determining that one or more finalizing tasks have been completed;
signaling the one or more AGVs to couple with the cart at the finalizing area;
signaling the one or more AGVs to transport the cart to an induction area of the fulfillment center; and
assigning a second set of shipping cartons to the cart.

20. A system comprising:
a plurality of automated guided vehicles (AGVs) including a first AGV of a first type and a second AGV of a second type, the first type being adapted to transport a plurality of shipping cartons, the second type adapted to manipulate and transport one or more mobile storage containers;
a picking station having one or more shelves at one or more first sides, the one or more shelves being adapted to hold the one or more mobile storage containers, the picking station including one or more second sides at which a cart transported by the first AGV of the first type is received; and one or more processors that cause the system to perform operations including:
- assigning a set of shipping cartons to the cart, the cart being adapted to hold the set of shipping cartons and couple with the first AGV;
- receiving scan data of the set of shipping cartons indicating that the set of shipping cartons are held by the cart;
- signaling the first AGV to couple with the cart;
- based on the scan data and the first AGV being coupled with the cart, signaling the first AGV to navigate to a first location of a first item in a storage area, the first item being assigned to at least one of the set of shipping cartons;
- outputting a first instruction to one or more client devices instructing one or more pickers to remove the first item from storage in the storage area and place the first item into the at least one of the set of shipping cartons;
- signaling the first AGV to transport the set of shipping cartons from the first location to the picking station;
- instructing the second AGV to deliver a second item to the picking station in the one or more mobile storage containers;
- outputting a second instruction to the one or more client devices instructing the one or more pickers to place the second item into the at least one of the set of shipping cartons on the cart at the picking station;
- determining, by the one or more processors, that the second item has been placed into the at least one of the set of shipping cartons at the picking station; and
- based on determining that the second item has been placed into the at least one of the set of shipping cartons, signaling the first AGV to transport the cart holding the set of shipping cartons to a finalizing area of a fulfillment center.

* * * * *